United States Patent
Inamura et al.

(10) Patent No.: US 9,275,317 B2
(45) Date of Patent: Mar. 1, 2016

(54) COLOR PREDICTION SYSTEM AND COLOR PREDICTION METHOD

(71) Applicant: Toppan Printing Co., Ltd., Taito-ku, Tokyo (JP)

(72) Inventors: Takashi Inamura, Taito-ku (JP); Tomohiro Horiuchi, Taito-ku (JP); Takaya Tanaka, Taito-ku (JP); Koichi Iino, Taito-ku (JP)

(73) Assignee: Toppan Printing Co., Ltd., Tokyo (JP)

( * ) Notice: Subject to any disclaimer, the term of this patent is extended or adjusted under 35 U.S.C. 154(b) by 0 days.

(21) Appl. No.: 14/711,568

(22) Filed: May 13, 2015

(65) Prior Publication Data
US 2015/0332132 A1 Nov. 19, 2015

(30) Foreign Application Priority Data
May 15, 2014 (JP) .................................. 2014-101812

(51) Int. Cl.
*H04N 1/60* (2006.01)
*G06K 15/02* (2006.01)
*G06K 1/00* (2006.01)

(52) U.S. Cl.
CPC .................................. *G06K 15/1878* (2013.01)

(58) Field of Classification Search
None
See application file for complete search history.

(56) References Cited

U.S. PATENT DOCUMENTS

| 2005/0094169 A1* | 5/2005 | Berns | H04N 1/6033 358/1.9 |
| 2011/0149311 A1* | 6/2011 | Mestha | H04N 1/62 358/1.9 |

FOREIGN PATENT DOCUMENTS

| JP | 2006-329753 A | 12/2006 |
| JP | 2007-516663 A | 6/2007 |

OTHER PUBLICATIONS

Inamura et al, "Proceeding of the 130th Conference of the Japanese Society of Printing Science and Technology", Nov. 15, 2015, pp. 37-40.
Toppan Printing Co., Ltd., "Toppan Printing's establishment on high precision color-management coping with various colors" News Release, Nov. 20, 2013.
Declaration filed with Japan Patent Office on Jun. 3, 2014, pursuant to Article 30 (4) of the Japanese Patent Law.

* cited by examiner

*Primary Examiner* — Quang N Vo
(74) *Attorney, Agent, or Firm* — Foley & Lardner LLP

(57) ABSTRACT

A color prediction system includes: database storing absorption/scattering coefficients of each primary color ink; sections for: selecting a spot color ink as a combination of primary color inks that reproduce a colorimetric value of a color sample, reading absorption and scattering coefficients of the primary color inks of a reference spot color from the database, obtaining absorption and scattering coefficients of the spot color ink of a specified formulation ratio, and calculating a spectral reflectance of the spot color ink to be reproduced; obtaining a reproduced color from the spectral reflectance; obtaining a difference from the colorimetric value of the color sample and correcting the formulation ratio to calculate a formulation ratio with an allowable difference; and calculating a Neugebauer primary color of overprinted spot color inks from the absorption and scattering coefficients of the spot color inks calculated at formulation ratios determined by the formulation ratio determination section.

8 Claims, 11 Drawing Sheets

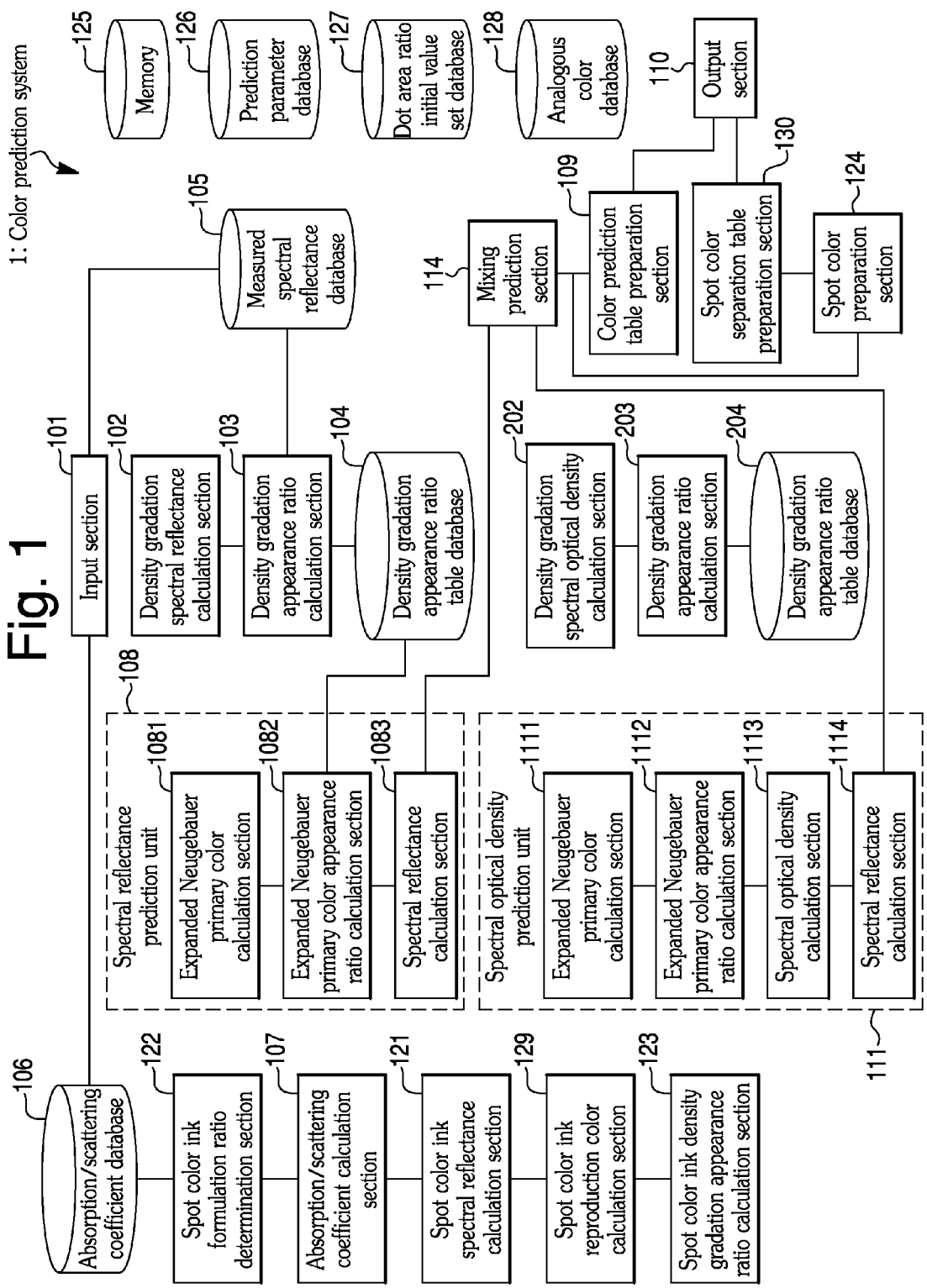

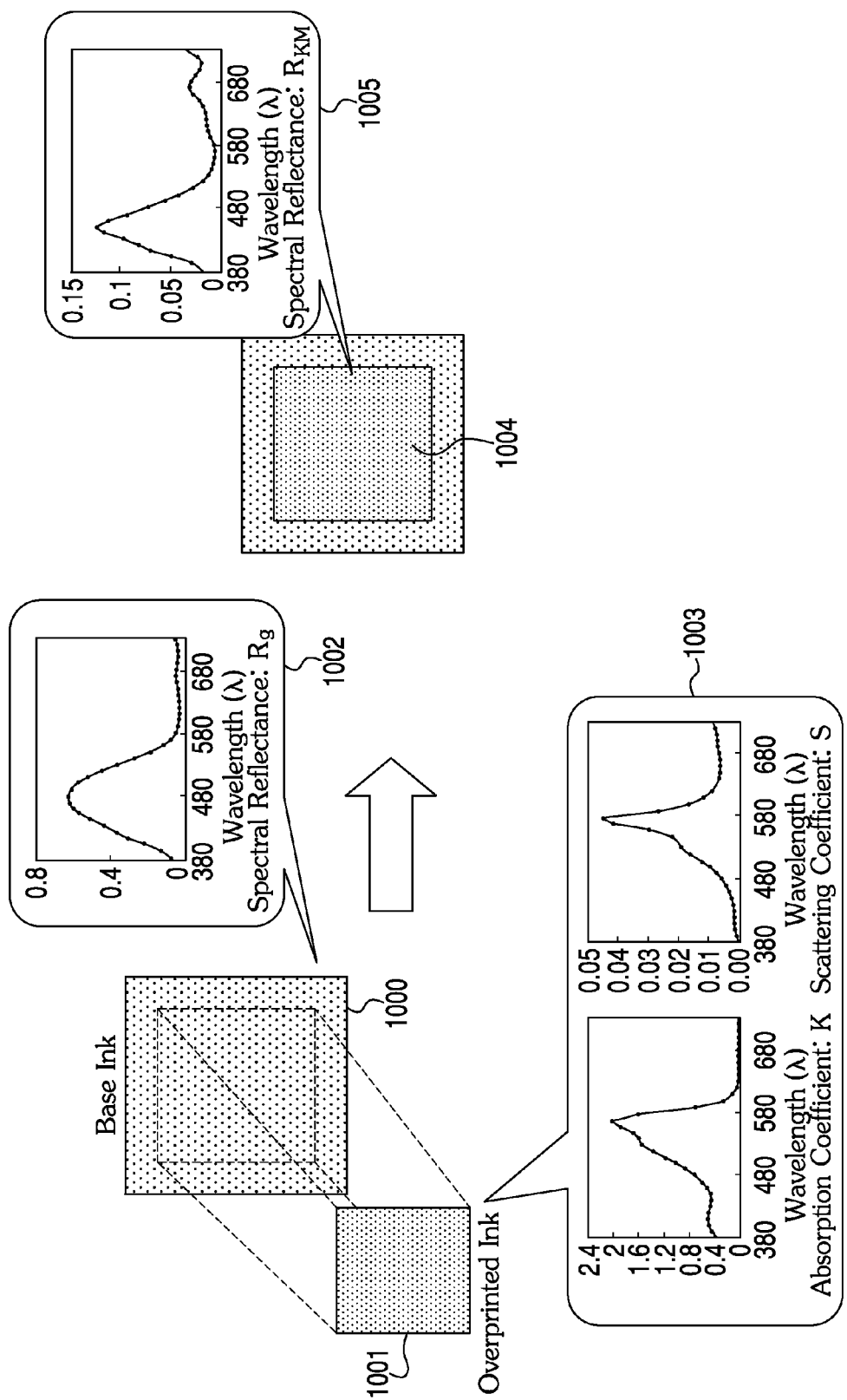

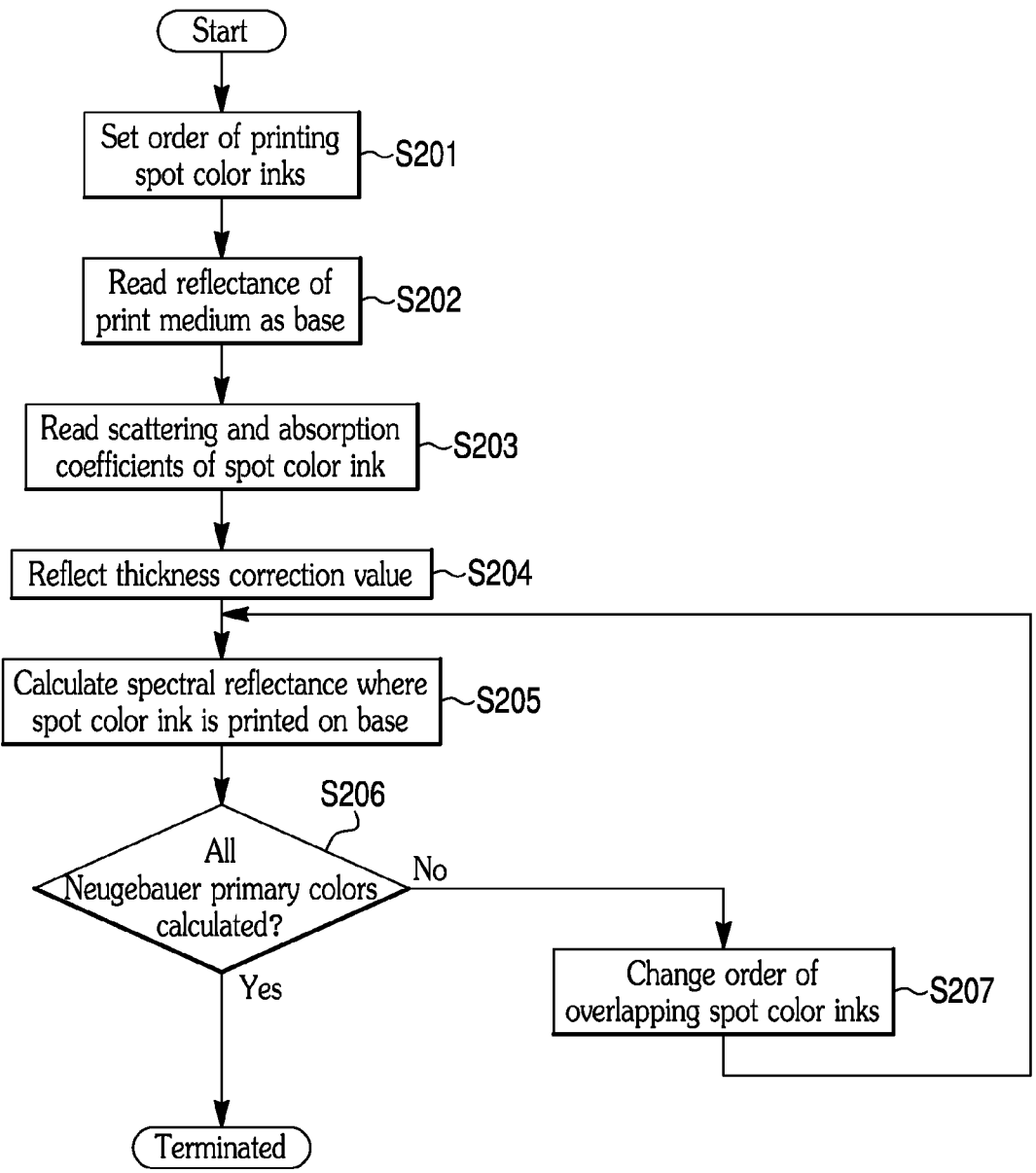

Fig. 7

| | Appearance Ratio (primary) | | Appearance Ratio (subsidiary) | Area |
|---|---|---|---|---|
| C | $\alpha 0*(1-\beta 0)$ | C100%M0% | $\alpha 1/(\alpha 1+\alpha 2)$ | Q1 |
| | | C50%M0% | $1-\alpha 1/(\alpha 1+\alpha 2)$ | Q2 |
| M | $(1-\alpha 0)*\beta 0$ | C0%M100% | $\beta 1/(\beta 1+\beta 2)$ | Q3 |
| | | C0%M50% | $1-\beta 1/(\beta 1+\beta 2)$ | Q4 |
| CM | $\alpha 0*\beta 0$ | C100%M100% | $\alpha 1/(\alpha 1+\alpha 2)*\beta 1/(\beta 1+\beta 2)$ | Q5 |
| | | C100%M50% | $\alpha 1/(\alpha 1+\alpha 2)*[1-\beta 1/(\beta 1+\beta 2)]$ | Q6 |
| | | C50%M100% | $[1-\alpha 1/(\alpha 1+\alpha 2)]*\beta 1/(\beta 1+\beta 2)$ | Q7 |
| | | C50%M50% | $[1-\alpha 1/(\alpha 1+\alpha 2)]*[1-\beta 1/(\beta 1+\beta 2)]$ | Q8 |
| W | $(1-\alpha 0)*(1-\beta 0)$ | C0%M0% | 1 | Q9 |

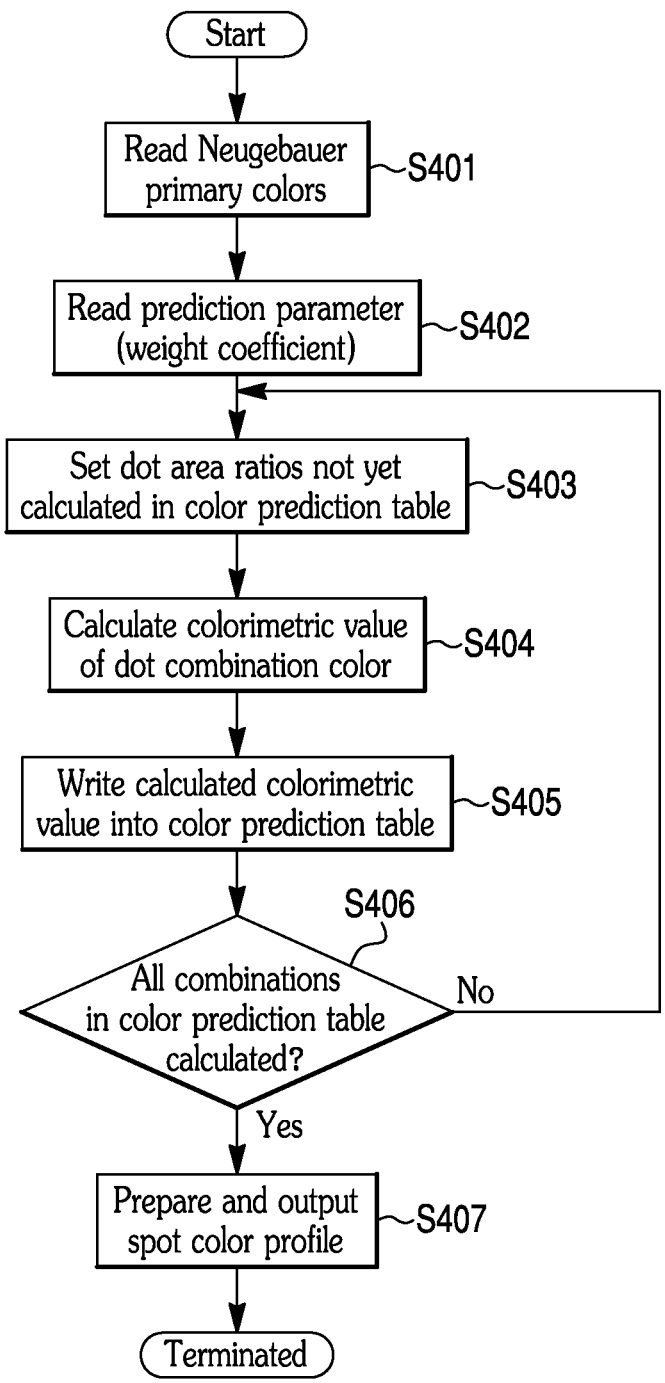

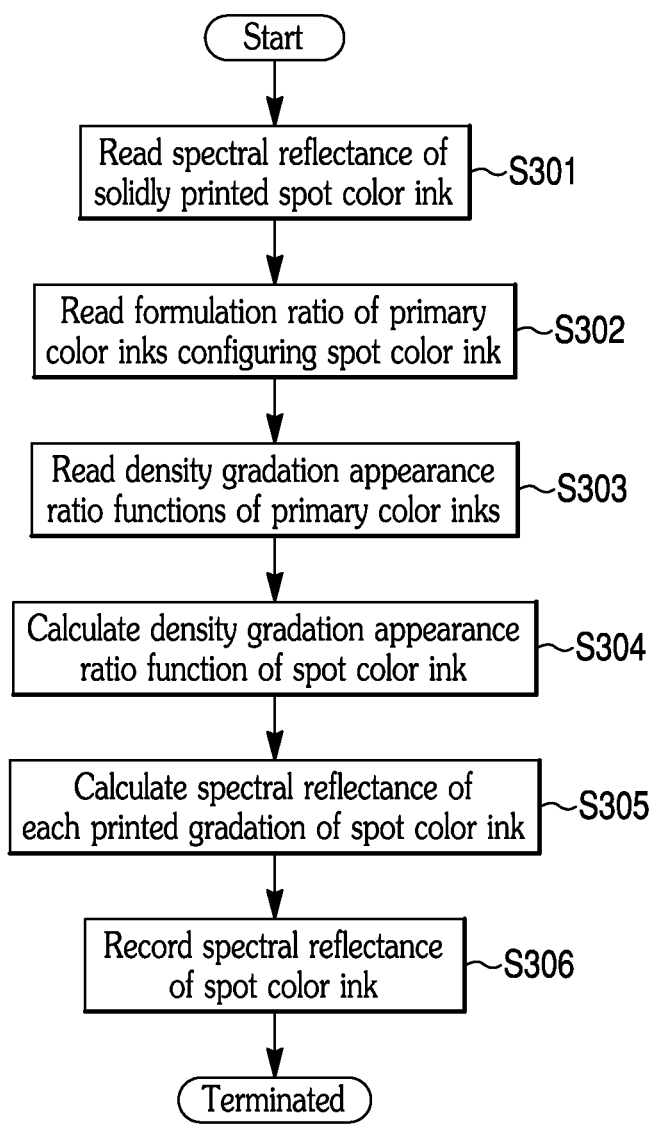

COLOR PREDICTION SYSTEM AND COLOR PREDICTION METHOD

CROSS-REFERENCE TO RELATED PATENT APPLICATIONS

This application is based on and claims the benefit of priority from earlier Japanese Patent Application No. 2014-101812 filed, May 15, 2014, the description of which is incorporated herein by reference.

BACKGROUND

1. Technical Field of the Invention

The present invention relates to a color prediction system and a color prediction method for predicting a reproduced color in performing color matching of a reproduced color printed by a printer.

2. Related Art

In color matching, for example, a reproduced color can be adjusted by area modulation (area modulation gradation). Such color matching is performed by predicting a color of a portion in which each color is printed with a given dot area ratio. There are some known techniques of such color prediction, including a method using Yule-Nielsen spectral Neugebauer model (e.g., see JP-A-2007-516663) and a method using a spectrally expanded Neugebauer model (e.g., see Journal of Japanese Society of Printing Science and Technology, Vol. 42, No. 5 (2005)).

The "spectrally expanded Neugebauer model" herein refers to a model in which Neugebauer primary colors and dot area ratios are expanded to the spectral model so as to serve as functions of wavelengths.

The models mentioned above are based on the precondition that, when dots are different in size, the dots are printed on a surface of a print medium with a solid single primary color ink of an even thickness. With this kind of model, the components ascribed to the scattering of light at an edge of each dot cannot be precisely expressed.

As a measure against this, there is a model in which the "spectrally expanded Neugebauer model" is expanded to more precisely take account of the components ascribed to the scattering of light at an edge of each dot (e.g., see JP-A-2006-329753).

The conventional art mentioned above predicts color reproduced on a surface of a print medium as a result of overprinting primary color inks.

On the other hand, a spot color ink is produced each time it is used, by formulating a plurality of primary color inks at an arbitrary formulation ratio. Therefore, an actually measured spectral reflectance is not available for such a spot color ink, unlike in the case of a primary color ink. Thus, the spectral reflectance cannot be calculated for each gradation of the spot color ink and thus color calculation cannot be performed using the above-mentioned model that is an expansion of the "spectrally extended Neugebauer model".

Further, in the conventional art mentioned above, it is difficult to predict a color which is reproduced by overprinting spot color inks, each being a mixture of primary color inks, on a surface of a print medium.

SUMMARY OF THE INVENTION

The present invention has been made in light of the circumstances set forth above and provides a color prediction system and a color prediction method for predicting a reproduced color resulting from overprinting spot color inks on a print medium.

A color prediction system of the present invention includes: an absorption/scattering coefficient database in which absorption coefficients and scattering coefficients of primary colors are written and stored in advance; a spot color ink spectral reflectance calculation section that selects a spot color ink configured by combining primary color inks which are preferable for reproducing a colorimetric value measured from a color sample whose color is desired to be reproduced, reads absorption coefficients and scattering coefficients of primary color inks contained in the reference spot color ink from the absorption/scattering coefficient database, obtains an absorption coefficient and a scattering coefficient of the spot color ink according to a specified formulation ratio, and calculates a spectral reflectance of the spot color ink desired to be reproduced, on the basis of the obtained absorption coefficient and scattering coefficient; a spot color ink reproduction color calculation section that obtains a reproduced color from the spectral reflectance calculated by the spot color ink spectral reflectance calculation section; a spot color ink formulation ratio determination section that obtains a difference from the colorimetric value measured from the color sample, and appropriately corrects the specified formulation ratio to calculate a formulation ratio which allows the difference to fall within a predetermined allowable range; and a spectral data calculation section that calculates a Neugebauer primary color resulting from overprinting the spot color inks, on the basis of the absorption coefficients and scattering coefficients of the spot color inks calculated from the respective formulation ratios of the spot color inks determined by the spot color ink formulation ratio determination section.

The color prediction system of the present invention includes: a density gradation appearance ratio table database that stores appearance ratio functions indicating appearance ratios of density gradation areas according to respective command dot area ratios, for each of primary color inks; a spot color density gradation appearance ratio calculation section that obtains an appearance ratio function of the spot color ink on the basis of formulation information of the primary color inks, using the appearance ratio functions of the primary color inks contained in the spot color ink; and a spot color density gradation spectral reflection calculation section that obtains a spectral reflectance of a density gradation area of the spot color ink, and the spectral data calculation section calculates a spectral reflectance indicating a reproduced color of the spot color having dots which are formed at the command dot area ratio, using a calculation model which expresses correlation of density gradation areas of the spot color ink and appearance ratios of the respective density gradation areas, with spectral reflectances.

In the color prediction system of the present invention, in estimating a reproduced color formed of dots of a plurality of spot color inks, the spectral reflectance calculated by the spectral data calculation section and the appearance ratio functions are used as bases to obtain combinations of the overlapped portions and appearance ratios thereof in each dot, and estimate a spectral reflectance where a dot is printed over another dot.

The color prediction system of the present invention further includes a prediction parameter database that stores color prediction parameters including mixing ratios for mixing the spectral reflectance of the spot color ink obtained by the spectral data calculation section through the calculation model, with the spectral reflectance obtained by the spectral data calculation section using spectral optical densities.

The color prediction system of the present invention further includes a color prediction table preparation section that allows the spectral data calculation section to calculate a spectral reflectance for each combination of command dot area ratios of each of the spot color inks to be overprinted with each other, and prepares a profile of a reproduced color in a color space.

The color prediction system of the present invention further includes a spot color separation table preparation section that obtains, for each of serial coordinate values in a color space, a command dot area ratio of each of spot color inks that reproduce a color of the coordinate values.

In the color prediction system of the present invention, a print medium on which spot color inks are printed, printing order of the spot color inks in performing overprinting, and a thickness of each spot color ink are optionally set.

A color prediction method of the present invention includes steps of: spot color ink spectral reflectance calculation in which a spot color ink spectral reflectance calculation section selects a spot color ink configured by combining primary color inks which are preferable for reproducing a colorimetric value measured from a color sample whose color is desired to be reproduced, reads absorption coefficients and scattering coefficients of primary color inks contained in the reference spot color ink from an absorption/scattering coefficient database that stores in advance absorption coefficients and scattering coefficients of primary colors, obtains an absorption coefficient and a scattering coefficient of the spot color ink according to a specified formulation ratio, and calculates a spectral reflectance of the spot color ink desired to be reproduced, on the basis of the obtained absorption coefficient and scattering coefficient; spot color ink reproduction color calculation in which a spot color ink reproduction color calculation section obtains a reproduced color from the spectral reflectance calculated by the spot color ink spectral reflectance calculation section; spot color formulation ratio determination in which a spot color ink formulation ratio determination section obtains a difference from the colorimetric value measured from the color sample, and appropriately corrects the specified formulation ratio to calculate a formulation ratio which allows the difference to fall within a predetermined allowable range; and spectral data calculation in which a spectral data calculation section calculates Neugebauer primary colors when the spot color inks are overprinted with each other, on the basis of the absorption coefficient and scattering coefficient of each of the spot color inks calculated from the respective formulation ratios of the spot color inks determined by the spot color ink formulation ratio determination section.

As described above, according to the present invention, a formulation ratio of primary color inks to be formulated for a spot color ink is obtained, and an absorption coefficient and a scattering coefficient of the spot color ink are obtained from the absorption coefficients and the scattering coefficients of the primary color inks. Further, a spectral reflectance of a spot color ink analogous to the color of a color sample is generated, and a single reproduced color of the spot color ink analogous to the color of the color sample is obtained. This enables prediction of a reproduced color resulting from overprinting of spot color inks on a print medium.

BRIEF DESCRIPTION OF THE DRAWINGS

In the accompanying drawings:

FIG. 1 is a block diagram illustrating an example of a configuration of a color prediction system according to a first embodiment of the present invention;

FIG. 4 is a diagram illustrating calculation of a density gradation spectral reflectance $R_{km}(\lambda)$ of an ink overprinted on an ink as a base;

FIG. 5 is a flow diagram illustrating a process of calculating a Neugebauer primary color by overprinting spot color inks;

FIG. 7 is a table showing calculation results of appearance ratios of areas Q1 to Q9 illustrated in FIG. 6B;

FIG. 8 is a flow diagram illustrating an example of a process of preparing a color prediction table performed by a color prediction table preparation section, according to a first embodiment;

FIG. 11 is a flow diagram illustrating a process of calculating a spectral reflectance for each gradation of a spot color ink.

DETAILED DESCRIPTION

Figure 2A:
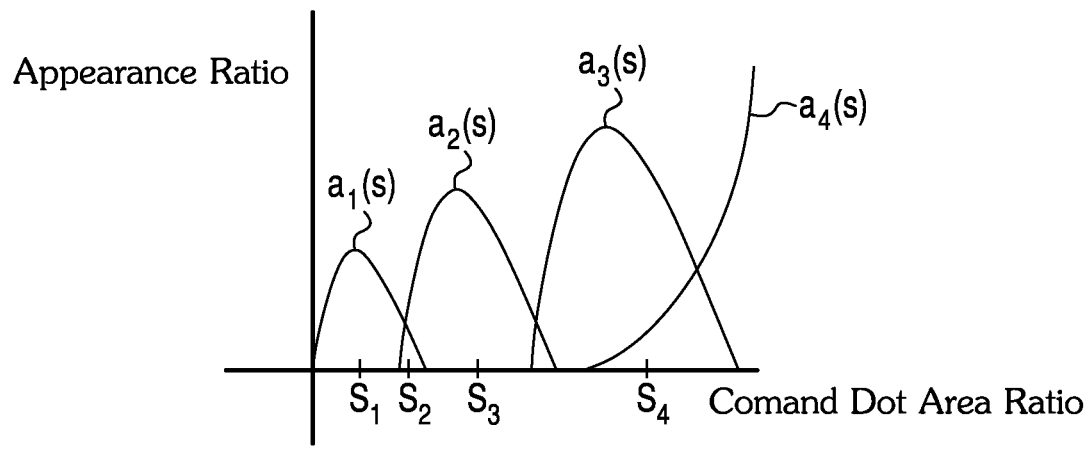
FIGS. 2A and 2B are diagrams illustrating correlation of command dot area ratios relative to appearance ratios of density gradation areas in each of dots that are formed at command dot area ratios.

In the present invention, in printing an ink onto a print medium such as by gravure printing, screen printing and offset printing, dots are formed on a surface of the print medium in conformity with a command dot area ratio indicating a gradient. Dots formed by gravure printing depend on a command dot area ratio, in respect of the area of a surface of a print medium onto which the ink is printed (area modulation gradation) and the thickness of the ink to be printed (density modulation gradation expression). For example, a dot formed in printing can have a structure analogous to that of a mountain. That is, a large mountain has a broad foot and a large height. In contrast, a mountain which is smaller than this large mountain has a narrower foot and a smaller height. In other words, dots formed in printing depend on a command dot area ratio, in respect of not only the area onto which the ink is printed, but also the thickness of the ink to be printed.

Therefore, in the present embodiments, a calculation model (core-fringe model described later) is used for modelizing a structure of each dot formed in printing. In this calculation model, the area of a dot on a surface of a print medium to which an ink is printed and the thickness of the ink in a dot to be printed are expressed according to a command dot area ratio. In performing color prediction for each gradient of a primary color or a spot color printed onto a print medium (e.g., paper), the present embodiments use a calculation model that modelizes a shape of a dot in each gradient. The dot in the modelization is generated at a command dot area ratio and formed of a plurality of density gradation areas (similar to the configuration of a contour).

With reference to the accompanying drawings, hereinafter are described some embodiments of the present invention.

Referring to FIGS. 1 to 9 first, a first embodiment of the present invention is described.

FIG. 1 is a block diagram illustrating an example of a configuration of a color prediction system 1 according to the first embodiment. In FIG. 1, the color prediction system 1 includes an input section 101, density gradation spectral reflectance calculation section 102, density gradation appearance ratio calculation section 103, density gradation appearance ratio table database 104, measured spectral reflectance database 105, absorption/scattering coefficient database 106, absorption/scattering coefficient calculation section 107, spectral reflectance prediction unit 108, color prediction table preparation section 109, output section 110, spectral optical density prediction unit 111, mixing prediction section 114, spot color ink spectral reflectance calculation section 121, spot color ink formulation ratio determination section 122, spot color ink density gradation appearance ratio calculation section 123, spot color separation section 124, memory 125, prediction parameter database 126, dot area ratio initial value set database 127, analogous color database 128, spot color ink reproduction color calculation section 129, spot color separation table preparation section 130, density gradation spectral optical density calculation section 202, density gradation appearance ratio calculation section 203, and density gradation appearance ratio table database 204.

The input section 101 is connected, for example, to an external computer for the input of data, such as a specified value of a command dot area ratio of each primary color, for the primary colors or a spot color ink set by a user.

The input section 101 may have an inputting means, such as a keyboard or a touch screen. In this case, data, such as a specified value of a command dot area ratio of each primary color of an ink set by a user, is inputted from the inputting means, and the inputted data is outputted to the individual sections inside the color prediction system 1.

The absorption/scattering coefficient database 106 stores, for each primary color ink, a scattering coefficient $S(\lambda)$ and an absorption coefficient $K(\lambda)$ of a color layer of the ink, the coefficients being written in advance such as by the external computer. These coefficients are calculated from a print portion of the ink printed at a command dot area ratio of 100%, i.e. solidly printed, on a print medium (e.g., paper, such as coated paper). In calculating the scattering coefficient $S(\lambda)$ and the absorption coefficient $K(\lambda)$, each primary ink is solidly printed on a white print medium and a black print medium to prepare the respective print portions.

Then, a spectral reflectance is measured for a color layer of the ink solidly printed on a surface of each of the white and black print media. The spectral reflectance in a print portion on the surface of the white print medium is referred to as a white-measured spectral reflectance, and the spectral reflectance in a print portion on the surface of the black print medium is referred to as a black-measured spectral reflectance.

Based on the white- and black-measured spectral reflectances, the scattering coefficient $S(\lambda)$ and the absorption coefficient $K(\lambda)$ in each of the print portions are calculated, in which a primary color ink is solidly printed on the print medium. The scattering coefficient $S(\lambda)$ and the absorption coefficient $K(\lambda)$ are calculated with a plurality of wavelengths $\lambda$ in a predetermined wavelength range.

The analogous color database 128 stores in advance a colorimetric value and a formulation ratio of primary colors, in respect of each of a plurality of spot color inks (reference spot color inks) each having a different combination of primary color inks as formulated.

The measured spectral reflectance database 105 stores in advance, for each primary color ink, measured spectral reflectances $R_s(\lambda)$ of print portions on a print medium, in which the primary color ink is printed at a plurality of command dot area ratios. The reflectances $R_s(\lambda)$ are written in advance into the database 105 by the external computer or the like. For example, the print portions are provided in the form of a step chart resulting from printing m-step command dot area ratios. In obtaining the measured spectral reflectances $R_s(\lambda)$, dots of a plurality of command dot area ratios are printed using a primary color ink onto a print medium to be actually used. The symbol "s" herein represents a command dot area ratio. Then, the spectral reflectances of the print medium are measured for each print portion having dots at a command dot area ratio. Further, the measured spectral reflectance database 105 stores in advance a base spectral reflectance $R_0(\lambda)$ of a print medium actually used for printing, similar to the measured spectral reflectances $R_s(\lambda)$. The base spectral reflectance $R_0(\lambda)$ is written in advance such as by the external computer.

The memory 125 stores in-progress calculation results of the individual sections of the present embodiment. A scattering/absorption coefficient table, spot color ink formulation ratio table, spot color ink density gradation appearance ratio table, Neugebauer primary color table, spectral reflectance table, color prediction table, spot color separation table, and the like are written and stored to the memory 125.

The prediction parameter database 126 of the present embodiment stores weight coefficients w, which will be described later, to be used in the mixing prediction section 114. Each weight coefficient w is calculated by printing data as a training data, and minimizing an error between a spectral reflectance obtained from a model prepared by the weight coefficient and a spectral reflectance of the printed data. When the Neugebauer model modified by the Yule-Nielsen correction is used as a spectral reflection prediction model for a printed color, an n value may be set.

The dot area ratio initial value set database 127 receives and stores in advance initial values of command dot area ratio to be used by the spot color separation section 124, for each number of colors of spot color inks to be used.

<Calculation of Density Gradation Appearance Ratio on the Basis of Spectral Reflectance>

The density gradation spectral reflectance calculation section 102 reads an absorption coefficient $K(\lambda)$ and a scattering coefficient $S(\lambda)$ from the absorption/scattering coefficient database 106, according to the kind of the primary color ink supplied from the input section 101. Further, the density gradation spectral reflectance calculation section 102 reads measured spectral reflectances $R_s(\lambda)$ of the respective command dot area ratios, and a base spectral reflectance $R_0(\lambda)$ from the measured spectral reflectance database 105, according to the kind of the primary color ink and the kind of print medium supplied from the input section 101.

Then, the density gradation spectral reflectance calculation section 102 substitutes the absorption coefficient $K(\lambda)$ and the scattering coefficient $S(\lambda)$ of the primary color ink, and the base spectral reflectance $R_0(\lambda)$ of the print medium read from the absorption/scattering coefficient database 106 and the measured spectral reflectance database 105, and a thickness coefficient $X_m$ of density gradation (as will be described later, the thickness $X_m$ is changed for each density gradation area), into the following Formula (1) (Kubelka-Munk equation) to calculate density gradation spectral reflectances $R_{i1}(\lambda)$, $R_{i2}(\lambda)$, $R_{i3}(\lambda)$, ... $R_{im}(\lambda)$.

In the following Formula (1), $a(\lambda)$ indicates a value obtained by adding the scattering coefficient $S(\lambda)$ and the absorption coefficient K(λ) and dividing the resultant value by the scattering coefficient S(λ). Also, b(λ) indicates a value obtained by squaring the value a(λ), subtracting 1 from the squared value, and calculating a square root of the subtracted value.

$$R_{KM}(\lambda) = \frac{1 - R_0(\lambda)(a(\lambda) - b(\lambda)(\coth(b(\lambda)S(\lambda)X_m)))}{a(\lambda) - R_0(\lambda) + b(\lambda)(\coth(b(\lambda)S(\lambda)X_m))} \quad (1)$$

$$a(\lambda) = \frac{S(\lambda) + K(\lambda)}{S(\lambda)}$$

$$b(\lambda) = (a(\lambda)^2 - 1)^{\frac{1}{2}}$$

Where,
$R_0(\lambda)$: Reflectance of base
$K(\lambda)$: Absorption coefficient
$S(\lambda)$: Scattering coefficient
$X_m$: Thickness coefficient In the present embodiment, the thickness coefficient $X_m$ of a printed ink in the above Formula (1), i.e. Kubelka-Munk equation, is based on the print portion in which the primary color ink is solidly printed on a print medium. The thickness coefficient $X_m$ is used as a value indicating a density gradation of the print portion. In other words, the thickness coefficient $X_m$ is arbitrarily set. For example, when a solidly printed print portion with a maximum thickness of the ink has a thickness of 100% and a thickness coefficient is 1, the number 1 is divided into the number of steps m of thickness in the density gradation areas. For example, when the density gradation areas have 5-step thickness, m=1, 2, 3, 4 or 5, and the thickness coefficient $X_m$ for each density gradation areas is expressed by $X_1$=1.0, $X_2$=0.8, $X_3$=0.6, $X_4$=0.4 and $X_5$=0.2.

As described above, the thickness coefficient $X_m$ is substituted into Formula (1), i.e. the Kubelka-Munk equation, together with the base spectral reflectance $R_0(\lambda)$ of the print medium, the absorption coefficient K(λ) and the scattering coefficient S(λ) to calculate the density gradation spectral reflectances $R_{i1}(\lambda)$, $R_{i2}(\lambda)$, $R_{i3}(\lambda)$, ... $R_{im}(\lambda)$ as respective spectral reflectances of the density gradation areas. The density gradation spectral reflectances $R_{i1}(\lambda)$, $R_{i2}(\lambda)$, $R_{i3}(\lambda)$, –$R_{im}(\lambda)$ are used, in a calculation model described later, as spectral reflectances of a plurality of respective density gradation areas configuring a dot.

The density gradation appearance ratio calculation section 103 reads the density gradation spectral reflectances $R_{i2}(\lambda)$, $R_{i3}(\lambda)$, ... $R_{im}(\lambda)$ from the density gradation spectral reflectance calculation section 102. Further, the density gradation appearance ratio calculation section 103 reads the measured spectral reflectances $R_s(\lambda)$ of the respective command dot area ratios from the measured spectral reflectance database 105.

Then, the density gradation appearance ratio calculation section 103 substitutes the density gradation spectral reflectances $R_{i1}(\lambda)$, $R_{i2}(\lambda)$, $R_{i3}(\lambda)$, ... $R_{im}(\lambda)$ into the following Formula (2) (calculation model) to calculate a calculated spectral reflectance R'(s, λ) through a process described later.

$$R'(s,\lambda) = R_{i1}(\lambda)a_a(s) + R_{i2}(\lambda)a_2(s) + \ldots + R_{im}(\lambda)a_m(s) + R_0(\lambda)(1 - a_1(s) - a_2(s) - \ldots - a_m(s)) \quad (2)$$

The density gradation appearance ratio calculation section 103 changes the value of an appearance ratio (area ratio of each of density gradation areas configuring a dot, relative to each density gradation in a print portion of paper) in the following Formula (3), while calculating the calculated spectral reflectance R'(s, λ). Then, the density gradation appearance ratio calculation section 103 calculates, for each command dot area ratio, a mean square error RMSE between each calculated spectral reflectance R'(s, λ) and the measured spectral reflectance $R_s(\lambda)$ in a predetermined wavelength range.

The density gradation appearance ratio calculation section 103 calculates individual appearance ratios of density gradation areas with those the mean square error between the calculated spectral reflectance R'(s, λ) and the measured spectral reflectance Rs(λ) is minimized. The symbol s herein indicates a command dot area ratio.

The density gradation appearance ratio calculation section 103 calculates appearance ratio functions $a_1(s)$, $a_2(s)$, $a_3(s)$, ..., $a_m(s)$ of the density gradation areas on the basis of the respective appearance ratios of the density gradation areas.

The density gradation appearance ratio calculation section 103 may calculate the appearance ratio functions $a_1(s)$, $a_2(s)$, $a_3(s)$, ..., $a_m(s)$ for the respective density gradation areas by, for example, fitting a quadric of a command dot area ratio s to the obtained appearance ratios. The density gradation appearance ratio calculation section 103 writes and stores the calculated appearance ratio functions $a_1(s)$, $a_2(s)$, $a_3(s)$, ..., $a_m(s)$ of each density gradation area in the density gradation appearance ratio table database 104.

$$RMSE = \sqrt{\frac{1}{n} \sum_{\lambda=380nm}^{730nm} (R_s(\lambda) - R'(s,\lambda))^2} \quad (3)$$

In Formula (3) above, the density gradation appearance ratio calculation section 103 divides the wavelength λ of 380 nm to 730 nm into n regions, squares an error in each wavelength λ, and adds up the squared values to thereby obtain the mean square error RMSE, for each command dot area ratio.

As described above, the density gradation appearance ratio calculation section 103 uses the calculation model of Formula (2) to calculate the spectral reflectance R'(s, λ) (calculated spectral reflectance) of a print portion of a command dot area ratio. The spectral reflectance R'(s, λ) is calculated by multiplying the density gradation spectral reflectance $R_{im}(\lambda)$ of each of density gradations included in a dot, with corresponding one of the appearance ratio functions $a_1(s)$, $a_2(s)$, $a_3(s)$, ..., $a_m(s)$ of the density gradations, and adding up the values of the individual multiplications.

Figure 2B:
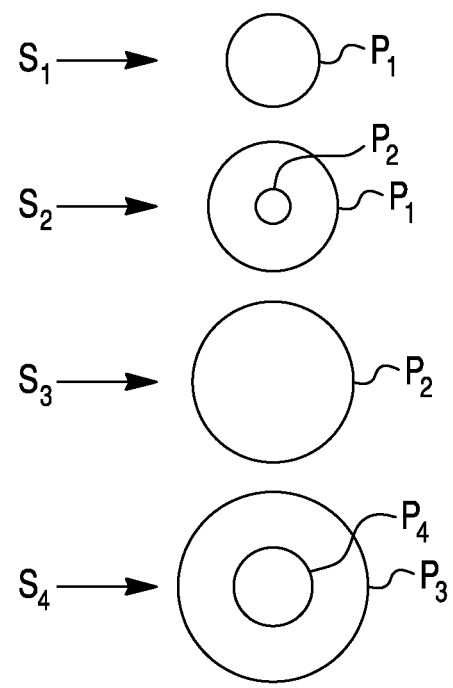

FIGS. 2A and 2B are diagrams illustrating a relationship between command dot area ratios and appearance ratios of density gradation areas in dots that are formed at command dot area ratios. In FIG. 2A, the horizontal axis indicates a command dot area ratio s and the vertical axis indicates an appearance ratio a. Based on the appearance ratio functions $a_m(s)$, an appearance ratio of each of the density gradation areas in a command dot area ratio can be calculated. As already described, the density gradation appearance ratio calculation section 103 calculates the appearance ratio function $a_m(s)$ for each density gradation area, by turning the appearance ratio of the density gradation area corresponding to the command dot area ratio calculated through Formula (3), into a function as an approximate equation in terms of a quadric. FIG. 2A shows the case where m=4, i.e., shows the appearance ratio functions $a_1(s)$, $a_2(s)$, $a_3(s)$ and $a_4(s)$ in respective density gradation areas of four gradations.

FIG. 2B is a diagram illustrating shapes, in a plan view, of dots in the respective command dot area ratios $s_1$, $s_2$, $s_3$ and $s_4$ shown in FIG. 2A. In a command dot area ratio $s_1$, only a density gradation area $P_1$ is formed. In a command dot area ratio $s_2$, a density gradation area $P_2$ is formed inside the density gradation area $P_1$. In a command dot area ratio $s_3$, only the density gradation area $P_2$ is formed. In a command dot area ratio $s_4$, a density gradation area $P_4$ is formed inside a density gradation area $P_3$. As described above, in the present embodiment, the structures of dots in gravure printing are modelized using the calculation model of Formula (2) as dot structures shown in FIG. 2B.

Referring to FIG. 1 again, the density gradation appearance ratio calculation section 103 writes and stores the calculated appearance ratio functions $a_m(s)$, indicating the appearance ratios of the respective density gradation areas in the command dot area ratio, into the density gradation appearance ratio table database 104, being correlated to the density gradation spectral reflectances of the density gradation areas. Similarly, the density gradation appearance ratio calculation section 103 writes and stores, for the rest of the primary color inks as well, the appearance ratio functions $a_m(s)$, indicating the appearance ratios of the respective density gradation areas in the command dot area ratio, into the density gradation appearance ratio table database 104.

The spot color ink spectral reflectance calculation section 121 reads a spot color ink having a colorimetric value most approximate to the colorimetric value of a color sample, from among spot color inks each having a different combination of primary color inks in the analogous color database 128. The analogous color database 128 stores the colorimetric values and the formulation ratios of primary colors of spot color inks. The formulation ratio of primary colors in the read spot color ink is set as a formulation ratio of primary colors of a spot color ink used for reproducing the color sample.

Further, the spot color ink spectral reflectance calculation section 121 reads the base spectral reflectance $R_0(\lambda)$ of the print medium from the measured spectral reflectance database 105.

The absorption/scattering coefficient calculation section 107 reads absorption coefficients $K_1(\lambda)$ and $K_2(\lambda)$, and scattering coefficients $S_1(\lambda)$ and $S_2(\lambda)$ of the respective primary color inks, for example, primary colors #1 and #2, which are included in the set formulation ratio, from the absorption/scattering coefficient database 106.

Then, the absorption/scattering coefficient calculation section 107 calculates an absorption coefficient $K_t(\lambda)$ and a scattering coefficient $S_t(\lambda)$ of the spot color ink in which the primary colors are mixed, through the following Formula (4). In the case of this spot color ink, the absorption coefficient $K_t(\lambda)$ and the scattering coefficient $S_t(\lambda)$ are calculated in Formula (4), according to the ratio of mixing of the primary color inks. Further, the spot color ink spectral reflectance calculation section 121 writes and stores the calculated scattering coefficient $S_t(\lambda)$ and absorption coefficient $K_t(\lambda)$ of the spot color ink in the scattering/absorption coefficient table of the memory 125.

$$K_t(\lambda)=\alpha K_1(\lambda)+\beta K_2(\lambda)$$

where $\alpha+\beta=1$ $$S_t(\lambda)=\alpha S_1(\lambda)+\beta S_2(\lambda)$$

where $\alpha+\beta=1$ \hfill (4)

In Formula (4), the factors $\alpha$ and $\beta$ indicate the ratio of mixing the primary color inks #1 and #2, respectively. The absorption coefficient $K_1(\lambda)$ of the primary color ink #1 is multiplied with the factor $\alpha$, while the absorption coefficient $K_2(\lambda)$ of the primary color ink #2 is multiplied with the factor $\beta$, and the multiplied values are added to obtain the absorption coefficient $K_t(\lambda)$ of the spot color ink. Similarly, the scattering coefficient $S_1(\lambda)$ of the primary color ink #1 is multiplied with the factor $\alpha$, while the scattering coefficient $S_2(\lambda)$ of the primary color ink #2 is multiplied with the factor $\beta$, and the multiplied values are added up to obtain the scattering coefficient $S_t(\lambda)$ of the spot color ink.

Thus, the spot color ink spectral reflectance calculation section 121 substitutes the absorption coefficient $K_t(\lambda)$, the scattering coefficient $S_t(\lambda)$, the base spectral reflectance $R_0(\lambda)$ of the print medium, and the thickness coefficient $X_m$, into Formula (1) to calculate a spectral reflectance $R_{KM}(\lambda)$ of the spot color ink.

The spot color ink reproduction color calculation section 129 sets a spectral distribution of a light source of the viewing environment, and the standard observer for the calculated spectral reflectance $R_{KM}(\lambda)$ of the spot color ink, converts the spectral reflectance $R_{KM}(\lambda)$ into a colorimetric value (e.g., L*a*b* value), and outputs the resultant value to the spot color ink formulation ratio determination section 122.

The spot color ink formulation ratio determination section 122 confirms a color difference between the colorimetric value calculated by the spot color ink reproduction color calculation section 129, and the colorimetric value of the color sample. Then, if the color difference is within an allowable range set in advance, the spot color ink formulation ratio determination section 122 writes and stores the formulation ratio of the primary color inks in the color calculated by the spot color ink spectral reflectance calculation section 121, as the kinds of the primary color inks configuring the spot color ink of the sample and as their formulation ratio, into the special ink formulation ratio table of the memory 125, together with spot color ink identification information that is the identification information for the spot color ink.

Figure 3:
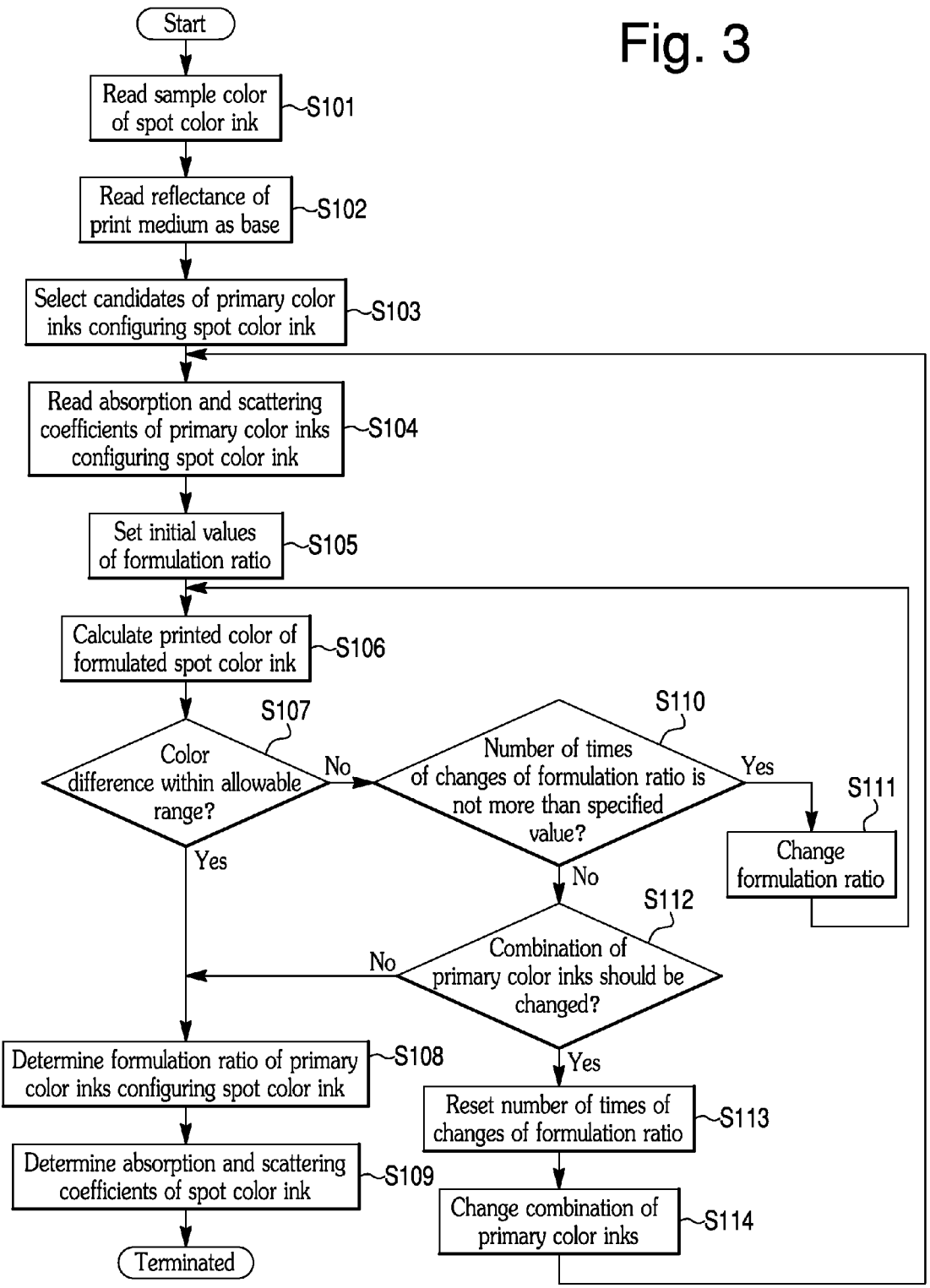
FIG. 3 is a flow diagram illustrating a process of determining a formulation ratio of primary color inks configuring a spot color ink.

FIG. 3 is a flow diagram illustrating a process of determining the formulation ratio of primary color inks configuring a spot color ink, and calculating the absorption coefficient $K_t(\lambda)$ and the scattering coefficient $St(\lambda)$.

Step S101:

A user measures a colorimetric value of a color sample used for reproduction and inputs the measured value to the color prediction system 1.

Step S102:

The spot color ink spectral reflectance calculation section 121 reads the base spectral reflectance $R_0(\lambda)$ that is a spectral reflectance of a print medium from the measured spectral reflectance database 105.

Step S103:

The spot color ink spectral reflectance calculation section 121 reads a combination of primary color inks configuring a spot color ink from an analogous color database 128. For example, the spot color ink spectral reflectance calculation section 121 in this case extracts and selects a spot color ink having a colorimetric value most approximate to a colorimetric value acquired from a color sample, from the analogous color database 128.

Step S104:

The absorption/scattering coefficient calculation section 107 reads the scattering coefficients $S(\lambda)$ and the absorption coefficients $K(\lambda)$ of the primary color inks configuring the selected spot color ink from the absorption/scattering coefficient database 106.

Step S105:

The spot color ink formulation ratio determination section 122 sets initial values of the formulation ratio of the primary color inks configuring the spot color ink. The initial values to be set are the values of the formulation ratio of the spot color that has been extracted, at step S103, from the analogous database 128.

Step S106:

Subsequently, the absorption/scattering coefficient calculation section 107 multiplies, as shown in Formula (4), the values of the formulation ratio of the primary color inks with the scattering coefficient S(λ) and the absorption coefficient K(λ), respectively, of each of the primary color inks.

Then, the absorption/scattering coefficient calculation section 107 adds the resultant values of the multiplication to calculate the scattering coefficient $S_r(\lambda)$ and the absorption coefficient $K_r(\lambda)$ of the spot color ink of the formulation ratio (e.g., expressed by a and β in Formula (4)).

The spot color ink spectral reflectance calculation section 121 substitutes the base spectral reflectance $R_0(\lambda)$ of the print medium, the scattering coefficient $S_r(\lambda)$ and the absorption coefficient $K_r(\lambda)$ into Formula (1) to calculate a spectral reflectance of the spot color ink. Further, the spot color ink reproduction color calculation section 129 calculates a colorimetric value from the spectral reflectance of the spot color ink calculated by the spot color ink spectral reflectance calculation section 121.

The spot color ink formulation ratio determination section 122 calculates a color difference between a colorimetric value L*a*b* of the color sample and a colorimetric value L*a*b* calculated by the spot color ink reproduction color calculation section 129.

Step S107:

Then, the spot color ink formulation ratio determination section 122 judges whether or not the color difference is within the preset allowable range.

If the color difference is within the preset allowable range, the spot color ink formulation ratio determination section 122 allows the process to proceed to step S108. On the other hand, if the color difference is not within the preset allowable range, the spot color ink formulation ratio determination section 122 allows the process to proceed to step S110.

Step S108:

Then, the spot color ink formulation ratio determination section 122 applies the formulation ratio of the primary color inks in the spot color ink corresponding to the color sample to currently used formulation ratio.

Then, the spot color ink formulation ratio determination section 122 writes and stores the kinds of the primary color inks in the spot color ink and the formulation ratio of the primary color inks into the formulation ratio table of the memory 125.

Step S109:

Then, the spot color ink formulation ratio determination section 122 applies the scattering coefficient $S_r(\lambda)$ and the absorption coefficient $K_r(\lambda)$ of the spot color ink corresponding to the color sample to currently used scattering coefficient $S_r(\lambda)$ and absorption coefficient $K_r(\lambda)$.

Then, the spot color ink formulation ratio determination section 122 writes and stores the scattering coefficient $S_r(\lambda)$ and the absorption coefficient $K_r(\lambda)$ of the spot color ink into the scattering/absorption ratio table of the memory 125.

Step S110:

The spot color ink formulation ratio determination section 122 judges whether or not the number of times of changing formulation ratio is not more than a preset specified number of times.

If the number of times of changing formulation ratio is not more than the preset specified number of times, the spot color ink formulation ratio determination section 122 allows the process to proceed to step S111. On the other hand, if the number of times of changing formulation ratio exceeds the preset specified number of times, the spot color ink formulation ratio determination section 122 allows the process to proceed to step S112.

Step S111:

The spot color ink formulation ratio determination section 122 changes the formulation ratio of the primary color inks configuring the spot color ink.

Then, the spot color ink formulation ratio determination section 122 increments a counter (increments the count value by one) that counts the number of times of changing formulation ratio and then allows the process to return to step S106.

Step S112:

The spot color ink formulation ratio determination section 122 displays a selection screen on a display section, not shown, of the color prediction system 1. The selection screen is used for determining whether or not the combination of the primary color inks should be changed.

If the user selects change of the combination of the primary color inks, the spot color ink formulation ratio determination section 122 allows the process to proceed to step S113. On the other hand, if the user selects non-change of the combination of the primary color inks, the spot color ink formulation ratio determination section 122 allows the process to proceed to step S108.

Step S113:

The spot color ink formulation ratio determination section 122 resets the counter that counts the number of times of changing formulation ratio to turn the count value, i.e. the number of times of change, to 0.

Step S114:

The spot color ink formulation ratio determination section 122 outputs a control signal to the spot color ink spectral reflectance calculation section 121 to have the combination of the primary color inks changed.

The spot color ink spectral reflectance calculation section 121 newly reads a combination of primary color inks configuring the spot color ink from the analogous color database 128.

Referring to FIG. 1 again, the spot color ink density gradation appearance ratio calculation section 123 calculates, for each density gradation area, an appearance ratio function $a_m(s)$ of a spot color ink that has been produced by mixing primary color inks at a predetermined ratio. Then, the spot color ink density gradation appearance ratio calculation section 123 writes and stores the calculated appearance ratio functions $a_m(s)$ in a special ink density gradation appearance ratio table of the memory 125. In this case, the spot color ink density gradation appearance ratio calculation section 123 reads appearance ratio functions $a_m(s)$ of any of the primary color inks configuring the spot color ink from the density gradation appearance ratio table database 104, to produce appearance ratio functions $a_m(s)$ of the spot color ink. The spot color ink density gradation appearance ratio calculation section 123 may combine the appearance ratio functions $a_m(s)$ of the respective primary color inks configuring the spot color ink in accordance with the formulation ratio of the primary color inks, for use as appearance ratio functions $a_m(s)$ of the spot color ink.

<Operation of Spectral Reflectance Prediction Unit 108>

The spectral reflectance prediction unit 108 includes an expanded Neugebauer primary color calculation section 1081, an expanded Neugebauer primary color appearance ratio calculation section 1082, and a spectral reflectance calculation section 1083.

The expanded Neugebauer primary color calculation section 1081 determines a base ink (a primary color ink or a spot color ink), and an ink to be printed on the surface of the base, according to an order of colors to be overlapped. Further, the expanded Neugebauer primary color calculation section 1081 reads command dot area ratios of the respective inks to be overlapped from the input section 101.

The expanded Neugebauer primary color calculation section 1081 reads the scattering coefficient S(λ) and the absorption coefficient K(λ) of primary color ink which is overlapped on the base ink from the absorption/scattering coefficient database 106. The expanded Neugebauer primary color calculation section 1081 reads the scattering coefficient $S_r(\lambda)$ and the absorption coefficient $K_r(\lambda)$ of the spot color ink to be overlapped on the base ink from the scattering/absorption coefficient table of the memory 125.

Then, in Formula (1), the expanded Neugebauer primary color calculation section 1081 substitutes, as the base spectral reflectance $R_0(\lambda)$, the density gradation spectral reflectance $R_{im}(\lambda)$ of a density gradation area in a dot of the ink (a spot color ink or a primary color ink) serving as a base, and also substitutes the scattering coefficient S(λ) and the absorption coefficient K(λ) of the ink to be overlapped on the base ink, as well as the thickness coefficient $X_m$ of the density gradation area, thereby calculating the density gradation reflectance $R_{im}(\lambda)$ in the density gradation area configuring the dot of the ink to be printed over the base ink.

For all of the combinations of the density gradation areas in a dot of the base ink, with the density gradation areas in a dot of the ink (a spot color ink or a primary color ink) to be overprinted on the dot of the base ink, the expanded Neugebauer primary color calculation section 1081 calculates, as mentioned above, the density gradation spectral reflectance $R_{km}(\lambda)$ of each overlapped portion between a density gradation area of the dot of the base ink and a density gradation area configuring the dot of the ink to be printed over the base ink.

FIG. 4 is a diagram illustrating a process of calculating the density gradation spectral reflectance $R_{im}(\lambda)$ of an ink to be overprinted on an ink as a base.

The density gradation spectral reflectance calculation section 102 uses the spectral reflectance of a print medium as the spectral reflectance $R_0(\lambda)$ of a base, and also uses the absorption reflectance K(λ) and the scattering reflectance S(λ) in a region of an ink 1000 to calculate, through Formula (1), the density gradation spectral reflectance Rim(λ) of a density gradation area of a dot in the region of the ink 1000 (a spot color ink or a primary color ink) printed onto the print medium.

Then, the expanded Neugebauer primary color calculation section 1081 calculates the spectral reflectance $R_{KM}(\lambda)$ shown in a region 1005, for an ink printed over a region 1004 on the ink 1000 that has a spectral reflectance shown in a region 1002. In this case, in Formula (1), the expanded Neugebauer primary color calculation section 1081 substitutes, as the spectral reflectance $R_0(\lambda)$ of the base, the spectral reflectance $R_{KM}(\lambda)$ of a density gradation area of a dot in the region of the ink 1000, and also substitutes the absorption coefficient K(λ) and the scattering coefficient S(λ) shown in a region 1003, and the thickness coefficient $X_m$ of a density gradation area of an ink 1001, thereby calculating the spectral reflectance $R_{KM}(\lambda)$ of a density gradation area of a dot of the ink 1001 (a spot color ink or a primary color ink) in the 1004, which has been printed over the region of the ink 1000 in the region 1004.

Thus, the expanded Neugebauer primary color calculation section 1081 calculates, as will be described later, the spectral reflectance $R_{KM}(\lambda)$ of an overlapped area in a density gradation area of a dot of the ink (a spot color ink or a primary color ink) overprinted on a dot of the base ink, in respect of all the combinations of the density gradation areas in a dot of the base ink with the density gradation areas in a dot of the overprinted ink. Thus, the spectral reflectances $R_{KM}(\lambda)$ are calculated for a print portion in which the ink is overprinted. The expanded Neugebauer primary color calculation section 1081 writes and stores the calculated spectral reflectances $R_{KM}(\lambda)$ in the Neugebauer primary color table of the memory 125.

FIG. 5 is a flow diagram illustrating a process of calculating a Neugebauer primary color by overlapping spot color inks. Ink to be overlapped may be only the spot color inks, or may be a combination of primary colors ink and spot color inks.

Step S201:

For each of combinations of spot color inks, a user inputs an order of printing the spot color inks into the color prediction system.

Step S202:

The expanded Neugebauer primary color calculation section 1081 reads the base spectral reflectance $R_0(\lambda)$ that is a spectral reflectance of the print medium, from the measured spectral reflectance database 105.

Step S203:

The expanded Neugebauer primary color calculation section 1081 reads the scattering coefficient S(λ) and the absorption coefficient K(λ) of each spot color ink to be overlapped from the scattering/absorption coefficient table of the memory 125.

Step S204:

The expanded Neugebauer primary color calculation section 1081 stores a thickness coefficient that is a thickness correction value inputted by the user into an internal memory, for use in Formula (1) to reflect the thickness coefficient to the spectral reflectance.

Step S205:

The expanded Neugebauer primary color calculation section 1081 calculates the spectral reflectance $R_{KM}(\lambda)$ of a printed matter on which a spot color ink or a primary ink is printed as a base. In this case, the expanded Neugebauer primary color calculation section 1081 calculates the Neugebauer primary colors for all the combinations of thickness coefficients of the spot color inks to be overlapped with each other. Specifically, the expanded Neugebauer primary color calculation section 1081 calculates the spectral reflectance $R_{KM}(\lambda)$ of the spot color ink printed on a print medium as a base, and uses the calculated spectral reflectance $R_{KM}(\lambda)$ as a spectral reflectance of a new base. Then, the expanded Neugebauer primary color calculation section 1081 calculates a spectral reflectance when a new spot color ink is overlapped on the spot color ink for which the spectral reflectance $R_{KM}(\lambda)$ has been calculated, and uses the calculated spectral reflectance as the spectral reflectance $R_{KM}(\lambda)$ of a Neugebauer primary color.

When the base is a solidly printed ink, such as a process ink, and the actual measured value of the spectral reflectance is known, the spectral reflectance in printing the ink over the medium does not have to be necessarily calculated, but the spectral reflectance as the known actual measured value may be used as a spectral reflectance of the base on which a special ink is overlapped.

Then, the expanded Neugebauer primary color calculation section 1081 writes and stores the calculated spectral reflectance $R_{KM}(\lambda)$ in the Neugebauer primary color table of the memory 125.

Step S206:

The expanded Neugebauer primary color calculation section 1081 judges whether or not Neugebauer primary colors have been calculated for all the combinations of the spot color inks.

If the calculations of all the Neugebauer primary colors have been completed, the expanded Neugebauer primary color calculation section 1081 terminates the process. On the other hand, if the calculations of all of the Neugebauer primary colors have not been completed, the expanded Neugebauer primary color calculation section 1081 allows the process to proceed to step S207.

Step S207:

The expanded Neugebauer primary color calculation section 1081 changes the combination of the spot color inks, turns the order of overlapping the spot color inks to the next order of overlapping the spot color inks, and allows the process to return to step S205.

Referring to FIG. 1 again, the expanded Neugebauer primary color appearance ratio calculation section 1082 calculates an appearance ratio, i.e. a ratio that a density gradation area of the base ink overlaps a density gradation area of an ink to be overprinted on the base ink.

Figure 6A:
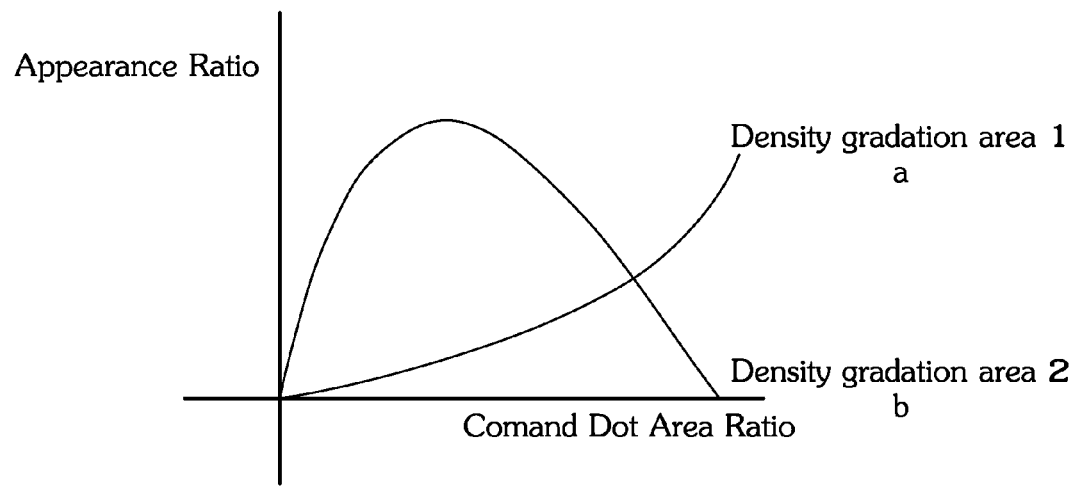
FIGS. 6A and 6B are diagrams illustrating calculation of an appearance ratio of an overlap of a density gradation area of a base ink with a density gradation area of an ink overprinted on the base ink (a spot color ink or a primary color ink)
Figure 6B:
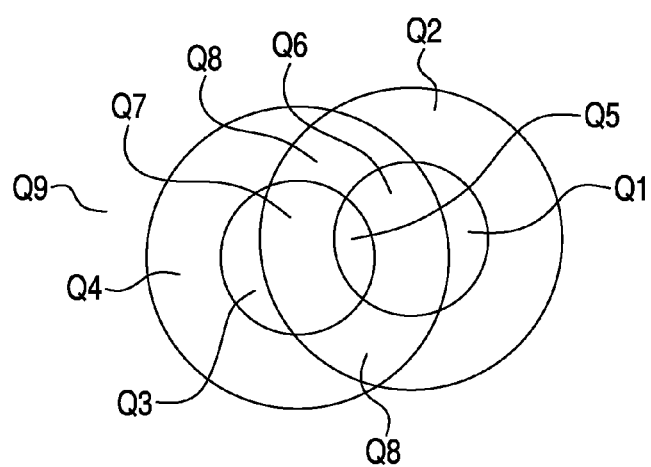

FIGS. 6A and 6B are diagrams illustrating calculation of an appearance ratio of an overlap of a density gradation area of a base ink with a density gradation area of an ink to be overprinted on the base ink (a spot color ink or a primary color ink).

For the sake of simplicity, FIGS. 6A and 6B show that two kinds of inks are overlapped with each other and there are two kinds of density gradation areas. However, in the case where three or more kinds of inks are overlapped and thus there are three or more kinds of density gradation areas, the calculation of an appearance ratio of an overlap of a density gradation area of the base ink with density gradation areas of the inks to be overprinted on the base ink can be similarly conducted as described below.

FIG. 6A shows the case where inks #1 and #2 each have two kinds of density gradation areas, i.e. a core and a fringe. Specifically, FIG. 6A shows a relationship between a command dot area ratio (set dot %) of the ink #1, and appearance ratios of the core and the fringe of the ink #1, appearing in a dot in the command dot area ratio. The ink #2 also has relationship similar to the ink #1. The inks #1 and #2 may each be a primary color ink or a spot color ink. Each of the inks #1 and #2 has two kinds of density gradation areas which are a density gradation core area 1 and a density gradation fringe area 2. In both of the inks #1 and #2, the density gradation core area 1 has a thickness of 100%, while the density gradation fringe area 2 has a thickness of 50%. Other ink has similar correlations.

FIG. 6B shows overlaps of the density gradation core areas 1 and the density gradation fringe areas 2 of the inks #1 and #2. In FIG. 6B, the ink #1, for example, is cyan (C) and the ink #2 is Magenta (M). There are nine kinds of combinations of the density gradation core areas 1 and the density gradation fringe areas 2 of cyan and magenta as indicated by areas Q1 to Q9. The area Q1 is formed of only the density gradation core area 1 of cyan. The area Q2 is formed of only the density gradation fringe area 2 of cyan. The area Q3 is formed of only the density gradation core area 1 of magenta. The area Q4 is formed of only the density gradation fringe area 2 of magenta. The area Q5 is formed of the density gradation core areas 1 of cyan and magenta being overlapped. The area Q6 is formed of the density gradation fringe area 2 of magenta and the density gradation core area 1 of cyan being overlapped. The area Q7 is formed of the density gradation core area 1 of magenta and the density gradation fringe area 2 of cyan being overlapped. The area Q8 is formed of the density gradation fringe areas 2 of cyan and magenta being overlapped. The area Q9 includes neither of cyan and magenta.

FIG. 7 is a table that shows the results of calculation of an appearance ratio of each of the areas Q1 to Q9 shown in FIG. 6B. Although FIG. 7 shows the results of the calculation for the primary color inks C (cyan) and M (magenta), the similar calculation can be applied in obtaining appearance ratios associated with spot color inks. In the table, C indicates density gradation areas of cyan, M indicates density gradation areas of magenta, CM indicates areas in which the density gradation areas of cyan and magenta overlap, and W indicates an area in which neither of the cyan and magenta inks is present. In FIG. 7, $\alpha 1$ indicates an appearance ratio of the density gradation core area 1 of cyan, $\alpha 2$ indicates an appearance ratio of the density gradation fringe area 2 of cyan, and $\alpha 0$ indicates an appearance ratio that is a sum of $\alpha 1$ and $\alpha 2$ ($\alpha 0 = \alpha 1 + \alpha 2$). Further, $\beta 1$ indicates an appearance ratio of the density gradation core area 1 of magenta, $\beta 2$ indicates an appearance ratio of the density gradation fringe area 2 of magenta, and $\beta 0$ indicates an appearance ratio that is a sum of $\beta 1$ and $\beta 2$ ($\beta 0 = \beta 1 + \beta 2$).

The areas Q1 and Q2 each have a primary appearance ratio obtained by multiplying the appearance ratio $\alpha 0$ at which the cyan ink appears, with $(1-\beta 0)$ that is a ratio at which the magenta ink does not appear, as expressed by $\alpha 0 \ast (1-\beta 0)$. Thus, the areas Q1 and Q2 each show an appearance ratio of an area of only the cyan ink. In the present embodiment, the mark * indicates multiplication.

The areas Q3 and Q4 each have a primary appearance ratio obtained by multiplying the appearance ratio $\beta 0$ at which the magenta ink appears, with $(1-\alpha 0)$ that is a ratio at which the cyan ink does not appear, as expressed by $\beta 0 \ast (1-\alpha 0)$. Thus, the areas Q3 and Q4 each have an appearance ratio of an area of only the magenta ink.

The areas Q5 to Q8 each have a primary appearance ratio obtained by multiplying the appearance ratio $\alpha 0$ at which the cyan ink appears, with the appearance ratio $\beta 0$ at which the magenta ink appears, as expressed by $\alpha 0 \ast \beta 0$. Thus, the areas Q5 to Q8 each show an appearance ratio of an area where the cyan and magenta inks are overlapped with each other.

The area Q9 has a primary appearance ratio obtained by multiplying $(1-\alpha 0)$ that is a ratio at which the cyan ink does not appear, with $(1-\beta 0)$ that is a ratio at which the magenta ink does not appear, as expressed by $(1-\alpha 0) \ast (1-\beta 0)$. Thus, the area Q9 shows an appearance ratio of an area where neither of the cyan and magenta inks is present.

The area Q1 has a subsidiary appearance ratio that is an appearance ratio of only the density gradation core area 1 in a dot of the cyan ink, and is obtained by dividing the appearance ratio $\alpha 1$ of the density gradation core area 1 by the sum of the appearance ratio $\alpha 1$ of the density gradation core area 1 and the appearance ratio $\alpha 2$ of the density gradation fringe area 2.

The area Q2 has a subsidiary appearance ratio that is an appearance ratio showing only the density gradation fringe area 2 in a dot of the cyan ink, and is obtained by dividing the appearance ratio $\alpha 1$ of the density gradation core area 1 by the sum of the appearance ratio $\alpha 1$ of the density gradation core area 1 and the appearance ratio $\alpha 2$ of the density gradation fringe area 2, and subtracting the result of the division from 1.

The area Q3 has a subsidiary appearance ratio that is an appearance ratio of only the density gradation core area 1 in a dot of the magenta ink, and is obtained by dividing the appearance ratio $\beta 1$ of the density gradation core area 1 by the sum of the appearance ratio $\beta 1$ of the density gradation core area 1 and the appearance ratio $\beta 2$ of the density gradation fringe area 2.

The area Q4 has a subsidiary appearance ratio that is an appearance ratio of only the density gradation fringe area 2 in a dot of the magenta ink and is obtained by dividing the appearance ratio β1 of the density gradation core area 1 by the sum of the appearance ratio β1 of the density gradation core area 1 and the appearance ratio β2 of the density gradation fringe area 2, and subtracting the result of the division from 1.

The area Q5 has a subsidiary appearance ratio that is an appearance ratio of a portion where the density gradation core areas 1 in the dots of the respective cyan and magenta inks overlap with each other. In obtaining the subsidiary appearance ratio of the area Q5, the appearance ratio α1 of the density gradation core area 1 in a dot of the cyan ink is divided by the sum of the appearance ratio α1 of the density gradation core area 1 and the appearance ratio α2 of the density gradation fringe area 2 to obtain a first value. Then, the appearance ratio β1 of the density gradation core area 1 in a dot of the magenta ink is divided by the sum of the appearance ratio β1 of the density gradation core area 1 and the appearance ratio β2 of the density gradation fringe area 2 to obtain a second value. Then, the first value is multiplied by the second value.

The area Q6 has a subsidiary appearance ratio that is an appearance ratio of a portion where the density gradation core area 1 in a dot of the cyan ink overlaps with the density gradation fringe area 2 in a dot of the magenta ink. In obtaining the subsidiary appearance ratio of the area Q6, the appearance ratio α1 of the density gradation core area 1 in a dot of the cyan ink is divided by the sum of the appearance ratio α1 of the density gradation core area 1 and the appearance ratio α2 of the density gradation fringe area 2 to obtain a third value. Then, the appearance ratio β1 of the density gradation core area 1 in a dot of the magenta ink is divided by the sum of the appearance ratio β1 of the density gradation core area 1 and the appearance ratio β2 of the density gradation fringe area 2, followed by subtracting the resultant value from 1, to obtain a fourth value. Then, the third value is multiplied with the fourth value.

The area Q7 has a subsidiary appearance ratio that is an appearance ratio in a portion where the density gradation fringe area 2 in a dot of the cyan ink overlaps with the density gradation core area 1 in a dot of the magenta ink. In obtaining the subsidiary appearance ratio of the area Q7, the appearance ratio α1 of the density gradation core area 1 in a dot of the cyan ink is divided by the sum of the appearance ratio α1 of the density gradation core area 1 and the appearance ratio α2 of the density gradation fringe area 2, followed by subtracting the resultant value from 1, to obtain a fifth value. Then, the appearance ratio β1 of the density gradation core area 1 in a dot of the magenta ink is divided by the sum of the appearance ratio β1 of the density gradation core area 1 and the appearance ratio β2 of the density gradation fringe area 2 to obtain a sixth value. Then, the fifth value is multiplied with the sixth value.

The areas Q8 each have a subsidiary appearance ratio that is an appearance ratio in a portion where the density gradation fringe area 2 in a dot of the cyan ink overlaps with the density gradation fringe area 2 in a dot of the magenta ink. In obtaining the subsidiary appearance ratio of each area Q8, the appearance ratio α1 of the density gradation core area 1 in a dot of the cyan ink is divided by the sum of the appearance ratio α1 of the density gradation core area 1 and the appearance ratio α2 of the density gradation fringe area 2, followed by subtracting the resultant value from 1, to obtain a seventh value. Then, the appearance ratio β1 of the density gradation core area 1 in a dot of the magenta ink is divided by the sum of the appearance ratio β1 of the density gradation core area 1 and the appearance ratio β2 of the density gradation fringe area 2, followed by subtracting the resultant value from 1, to obtain an eighth value. Then, the seventh value is multiplied with the eighth value.

The area Q9 has a subsidiary appearance ratio that is an appearance ratio of an area where neither of the cyan and magenta inks is present. The subsidiary appearance ratio of the area Q9 is 1.

As described above, the formulas of appearance ratio used for the overlaps of the inks to be used are set in advance and written and stored, in the form of a table as shown in FIG. 7, into the density gradation appearance ratio table database 104.

Referring to FIG. 1 again, the expanded Neugebauer primary color appearance ratio calculation section 1082 reads formulas from the table of FIG. 7 stored in the density gradation appearance ratio table database 104, according to the combination of the kinds of inks to be overlapped with each other, and the combination of the command dot area ratios expressing dots of the respective inks to be overlapped with each other.

Further, the expanded Neugebauer primary color appearance ratio calculation section 1082 reads the appearance ratios α1, α2, β1 and β2 of the density gradation core areas 1 and the density gradation fringe areas 2 of cyan and magenta, from the density gradation appearance ratio table database 104.

When cyan is used as a base and magenta is overprinted on the base, the expanded Neugebauer primary color calculation section 1081 applies the spectral reflectance of cyan to the spectral reflectance $R_0(\lambda)$ of base and, using the thickness of each of the density gradation areas of magenta that appears at a command dot area ratio, calculates the spectral reflectance $R_{KM}(\lambda)$ in an overlapped portion through Formula (1). For example, in calculating the spectral reflectance $R_{KM}(\lambda)$ in the area Q5, the expanded Neugebauer primary color calculation section 1081 applies the density gradation spectral reflectance $R_{im}(\lambda)$ of the cyan ink of 100% thickness on the print medium to the spectral reflectance $R_0(\lambda)$ of base, thereby calculating the spectral reflectance $R_{KM}(\lambda)$ in a print portion in the overlapped portion where the magenta ink of 100% thickness is overprinted on the cyan ink.

Similarly, in calculating the spectral reflectance $R_{KM}(\lambda)$ in the area Q7, the expanded Neugebauer primary color calculation section 1081 applies the density gradation spectral reflectance $R_{im}(\lambda)$ of the cyan ink of 50% thickness on the print medium to the spectral reflectance $R_0(\lambda)$ of base, thereby calculating the spectral reflectance $R_{KM}(\lambda)$ in the case where the magenta ink of 100% thickness is overprinted on the cyan ink. Similarly, the spectral reflectances $R_{KM}(\lambda)$ are calculated in respect of all the combinations of the expanded Neugebauer primary colors.

Then, the spectral reflectance calculation section 1083 multiplies the spectral reflectance of each of the expanded Neugebauer primary colors in the areas Q1 to Q9, with a corresponding one of the expanded Neugebauer primary color appearance ratios. The multiplied values are added up on a wavelength basis.

The spectral reflectance calculation section 1083 calculates a first predicted spectral reflectance $R_{D1}(\lambda)$ in a print portion, which would result from overprinting dots of the magenta ink on the print medium on which dots of the cyan ink are printed.

<Calculation of Density Gradation Appearance Ratio on the Basis of Spectral Optical Density>

The density gradation spectral optical density calculation section 202 reads the absorption coefficient $K(\lambda)$ and the scattering coefficient $S(\lambda)$ of a color layer obtained from a print portion in which a primary color ink is solidly printed on a print medium, from the absorption/scattering coefficient database 106, according to the kind of the primary color ink supplied from the input section 101. Further, the density gradation spectral optical density calculation section 202 reads the measured spectral reflectance $R_s(\lambda)$ of each command dot area ratio, and the base spectral reflectance $R_0(\lambda)$ of print medium, from the measured spectral reflectance database 105, according to the kind of the primary color ink and the kind of the print medium supplied from the input section 101.

Then, density gradation spectral optical density calculation section 202 substitutes the read absorption coefficient $K(\lambda)$ and scattering coefficient $S(\lambda)$, the base spectral reflectance $R_0(\lambda)$ of the print medium, and thickness coefficient $X_m$ of density gradation into Formula (1) (Kubelka-Munk equation) described above to thereby calculate the density gradation spectral reflectances $R_{i1}(\lambda)$, $R_{i2}(\lambda)$, $R_{i3}(\lambda)$, ... $R_{im}(\lambda)$ as spectral reflectances of the density gradation areas.

Further, the density gradation spectral optical density calculation section 202 converts the calculated density gradation spectral reflectances $R_{i1}(\lambda)$, $R_{i2}(\lambda)$, $R_{i3}(\lambda)$, ... $R_{im}(\lambda)$ to density gradation spectral optical densities $OD_{i1}(\lambda)$, $OD_{i2}(\lambda)$, $OD_{i3}(\lambda)$, ... $OD_{im}(\lambda)$, respectively, using the following Formula (5).

$$D(\lambda) = -\ln(R(\lambda)) \tag{5}$$

Similar to the density gradation spectral reflectance calculation section 102, the density gradation spectral optical density calculation section 202 also uses the thickness coefficient $X_m$ of the printed ink in Formula (1) (Kubelka-Munk equation), as a value indicating the density gradation of a print portion, on the basis of the print portion where the primary color ink is solidly printed on the print medium. Specifically, the thickness coefficient $X_m$ is arbitrarily set. For example, a solidly printed print portion having a largest thickness is 100% and the thickness coefficient is 1. In this case, the value 1 is divided by m, being correlated to the number of steps of the thickness of the density gradation areas. For example, when the density gradation areas indicated by a command dot area ratio have 5-step thickness, m=1, 2, 3, 4 and 5, and thus the thickness coefficient $X_m$ is expressed as $X_1=1.0$, $X_2=0.8$, $X_3=0.6$, $X_4=0.4$ and $X_5=0.2$, being correlated to the thickness steps of the respective density gradation areas.

As described above, in Formula (1), as a Kubelka-Munk equation, the thickness coefficient $X_m$ is substituted, together with the base spectral reflectance $R_0(\lambda)$ of the print medium, the absorption coefficient $K(\lambda)$ and the scattering coefficient $S(\lambda)$, for the calculation of the density gradation spectral reflectances $R_{i1}(\lambda)$, $R_{i2}(\lambda)$, $R_{i3}(\lambda)$, ... $R_{im}(\lambda)$ as the spectral reflectances of the density gradation areas included in a dot of the command dot area ratio. Then, the density gradation spectral reflectances $R_{i1}(\lambda)$, $R_{i2}(\lambda)$, $R_{i3}(\lambda)$, ... $R_{im}(\lambda)$ are converted to the density gradation spectral optical densities $OD_{i1}(\lambda)$, $OD_{i2}(\lambda)$, $OD_{i3}(\lambda)$, ... $OD_{im}(\lambda)$, respectively, using Formula (5). The density gradation spectral optical densities $OD_{i1}(\lambda)$, $OD_{i2}(\lambda)$, $OD_{i3}(\lambda)$, ... $OD_{im}(\lambda)$ are used, in a calculation model described later, as the respective spectral optical densities of the plurality of density gradation areas configuring a dot.

The density gradation appearance ratio calculation section 203 reads the density gradation spectral optical densities $OD_{i1}(\lambda)$, $OD_{i2}(\lambda)$, $OD_{i3}(\lambda)$, ... $OD_{im}(\lambda)$ from the density gradation spectral optical density calculation section 202. The density gradation appearance ratio calculation section 203 also reads the measured spectral reflectances $R_s(\lambda)$ of the respective command dot area ratios from the measured spectral reflectance database 105.

Then, using Formula (5), the density gradation appearance ratio calculation section 203 converts the measured spectral reflectances $R_s(\lambda)$ to respective measured spectral optical densities $OD_s(\lambda)$.

Then, the density gradation appearance ratio calculation section 203 substitutes the density gradation spectral optical densities $OD_{i1}(\lambda)$, $OD_{i2}(\lambda)$, $OD_{i3}(\lambda)$, ... $OD_{im}(\lambda)$ into the following Formula (6) (calculation model) to calculate a calculated spectral optical density $OD'(s, \lambda)$ through a process described later.

$$OD'(s,\lambda) = OD_{i1}(\lambda)a_1(s) + OD_{i2}(\lambda)a_2(s) + \ldots + OD_{im}(\lambda)a_m(s) + OD_0(\lambda)(1 - a_1(s) - a_2(s) - \ldots - a_m(s)) \tag{6}$$

Using the following Formula (7), the density gradation appearance ratio calculation section 203 calculates the calculated spectral optical density $OD'(s, \lambda)$, while changing the value of appearance ratio (ratio of the area of each of the density gradation areas in a density gradation, configuring a dot in a print portion of paper). Then, the density gradation appearance ratio calculation section 203 calculates a mean square error RMSE between each calculated spectral optical density $OD'(S, \lambda)$ and the corresponding measured spectral optical density $OD_s(\lambda)$, for each command dot area ratio, within a predetermined wavelength range. The density gradation appearance ratio calculation section 203 calculates the appearance ratios of the density gradation areas where the mean square error between the calculated spectral optical density $OD'(S, \lambda)$ and the measured spectral optical density $OD_s(\lambda)$ is minimized. The symbol s herein refers to a command dot area ratio.

Then, the density gradation appearance ratio calculation section 203 calculates appearance ratio functions $a_1(s)$, $a_2(s)$, $a_3(s)$, ..., $a_m(s)$ of the respective density gradation areas on the basis of the appearance ratios of the respective density gradation areas. In this case, the density gradation appearance ratio calculation section 203 may calculate an appearance ratio function of each density gradation area by fitting a quadric or the like of the command dot area ratio s to the corresponding appearance ratio as obtained. The density gradation appearance ratio calculation section 203 writes and stores the calculated appearance ratio functions $a_1(s)$, $a_2(s)$, $a_3(s)$, ..., $a_m(s)$ of the respective density gradation areas into the density gradation appearance ratio table database 204. As described in the spectral reflectance prediction unit 108, the appearance ratio functions $a_1(s)$, $a_2(s)$, $a_3(s)$, ..., $a_m(s)$ are used for calculating the appearance ratios of the density gradation areas, which are used in the calculation model of Formula (6). Thus, as described referring to FIGS. 2A and 2B, the appearance ratio functions $a_1(s)$, $a_2(s)$, $a_3(s)$, ..., $a_m(s)$ are used for modelizing the structure of a dot in gravure printing.

$$RMSE = \sqrt{\frac{1}{n} \sum_{\lambda=380nm}^{730nm} (OD_s(\lambda) - OD'(s, \lambda))^2} \tag{7}$$

In the above Formula (7), the density gradation appearance ratio calculation section 203 divides the wavelength $\lambda$ of 380 nm to 730 nm into n regions, squares an error in each wavelength $\lambda$ in the calculated spectral optical density $OD'(S, \lambda)$ and the measured spectral optical density $OD_s(\lambda)$, and adds up the squared values to thereby obtain the means square error RMSE, for each command dot area ratio.

As described above, the density gradation appearance ratio calculation section 203 uses the calculation model of Formula (6) to calculate the spectral optical density of a print portion where an ink (primary color ink) of a command dot area ratio is printed. In this case, the spectral optical density is calculated for each density gradation included in a dot by multiplying the density gradation spectral optical reflectance $OD_{im}$ (λ) of the density gradation with each of the appearance ratio functions $a_1(s), a_2(s), a_3(s), \ldots, a_m(s)$ of the density gradation, and adding the values of the multiplications.

The density gradation appearance ratio calculation section 203 writes and stores the appearance ratio functions $a_m(s)$ indicating the appearance ratios of the respective density gradation areas as obtained in a command dot area ratio of the density gradation areas, into the density gradation appearance ratio table database 204, being correlated to the respective density gradation spectral optical densities of the density gradation areas. Similarly, for each of other primary color inks, the density gradation appearance ratio calculation section 203 writes and stores the appearance ratio functions $a_m(s)$ indicating the appearance ratios of the density gradation areas in a command dot area ratio of the density gradation areas, into the density gradation appearance ratio table database 204.

In the case of a spot color ink prepared by mixing primary color inks at a predetermined ratio, the appearance ratio functions $a_m(s)$ of the density gradation areas of each of the primary color inks are read from the density gradation appearance ratio table database 204 and used. In this case, the appearance ratio functions $a_m(s)$ of any of the primary color inks to be mixed in the spot color ink may be used, or the appearance ratio functions $a_m(s)$ of the respective primary color inks to be mixed may be combined according to the formulation ratio and used.

In the case of this spot color ink, as described in the spectral reflectance prediction unit 108, the scattering coefficient $S_t(\lambda)$ and the absorption coefficient $K_t(\lambda)$ of the spot color ink are calculated according to the ratio of the primary color inks to be mixed, using Formula (4) described above.

In Formula (4), the factors α and β indicate a ratio at which the primary color inks #1 and #2 are mixed. The factor α is multiplied with the absorption coefficient $K_1(\lambda)$ of the primary color ink #1, while the factor β is multiplied with the absorption coefficient $K_2(\lambda)$ of the primary color ink #2, followed by adding up the multiplied values, for use as the absorption coefficient $K_t(\lambda)$ of the spot color ink. Similarly, the factor α is multiplied with the scattering coefficient $S_1(\lambda)$ of the primary color ink #1, while the factor β is multiplied with the scattering coefficient $S_2(\lambda)$ of the primary color ink #2, followed by adding up the multiplied values, for use as the scattering coefficient $S_t(\lambda)$ of the spot color ink.

<Operation of Spectral Optical Density Prediction Unit 111>

The spectral optical density prediction unit 111 includes an expanded Neugebauer primary color calculation section 1111, an expanded Neugebauer primary color appearance ratio calculation section 1112, a spectral optical density calculation section 1113, and a spectral reflectance calculation section 1114.

The expanded Neugebauer primary color calculation section 1111 determines a base ink (a primary color ink or a spot color ink) and an ink to be printed over the surface of the base, according to an order of overlapping the colors. The expanded Neugebauer primary color calculation section 1111 reads the command dot area ratios of the respective inks to be overlapped from the input section 101.

The expanded Neugebauer primary color calculation section 1111 reads the scattering coefficient $S(\lambda)$ and the absorption coefficient $K(\lambda)$ of an ink (a primary color ink or a spot color ink) to be overprinted on the base ink.

Then, as described referring to FIG. 4, the expanded Neugebauer primary color calculation section 1111 substitutes into Formula (1) a density gradation spectral reflectance $R_{im}$ (λ) of the base ink, the scattering coefficient $S(\lambda)$ and the absorption coefficient $K(\lambda)$ of an ink to be overprinted on the base ink, and the thickness coefficient $X_m$ of a density gradation area to thereby calculate the spectral reflectance $R_{km}$ (λ) of a dot of the ink to be overprinted on the base ink.

In this case, the expanded Neugebauer primary color calculation section 1111 calculates the density gradation spectral reflectances $R_{im}(\lambda)$ of a dot of the ink to be overprinted on the dot of the base ink, in respect of all the combinations of overlapped portions in each of which any of the density gradation areas in a dot of the base ink overlaps with any of the density gradation areas in a dot of the ink to be overprinted on the dot of the base ink. Then, the expanded Neugebauer primary color calculation section 1111 converts the obtained density gradation spectral reflectances $R_{im}(\lambda)$ of the ink to be overprinted on the dot of the base ink to the respective density gradation spectral optical densities $OD_{im}(\lambda)$ using Formula (5). The expanded Neugebauer primary color calculation section 1111 writes and stores the obtained density gradation spectral optical densities $OD_{im}(\lambda)$ into the Neugebauer primary color table of the memory 125.

Referring to FIG. 1 again, as described referring to FIGS. 6A and 6B, the expanded Neugebauer primary color appearance ratio calculation section 1112 calculates the appearance ratios of overlaps in each of which any of the density gradation areas of the base ink overlaps with any of the density gradation areas of the ink to be overprinted on the base ink.

As described in the spectral reflectance prediction unit 108, the formulas of appearance ratio used for the overlaps of inks (primary color inks or spot color inks) to be used have been written and stored, in the form of the appearance ratio table shown in FIG. 7, into the density gradation appearance ratio table database 204.

The expanded Neugebauer primary color appearance ratio calculation section 1112 reads formulas from the table of FIG. 7 stored in the density gradation appearance ratio table database 204, according to the combination of the kinds of the inks to be overlapped with each other and the combination of the command dot area ratios expressing dots of the respective inks to be overlapped with each other.

The expanded Neugebauer primary color appearance ratio calculation section 1112 also reads the appearance ratios $\alpha_1$, $\alpha_2$, $\beta_1$, and $\beta_1$ of the density gradation core areas 1 and the density gradation fringe areas 2 of cyan and magenta from the density gradation appearance ratio table database 204.

When the base is cyan, and magenta is overlapped on cyan, the expanded Neugebauer primary color calculation section 1111 applies the spectral reflectance of cyan to the spectral reflectance $R_0(\lambda)$ of base and, using the thickness of each of the density gradation areas of magenta that appears at the command dot area ratio, calculates the spectral reflectance $R_{KM}(\lambda)$ in an overlapped portion through Formula (1). For example, in calculating the spectral reflectance $R_{KM}(\lambda)$ in the area Q5, the expanded Neugebauer primary color calculation section 1111 applies the density gradation spectral reflectance $Rim(\lambda)$ of the cyan ink of 100% thickness on the print medium to the spectral reflectance $R_0(\lambda)$ of base, thereby calculating the spectral reflectance $R_{KM}(\lambda)$ in a print portion in the overlapped portion where the magenta ink of 100% thickness is overprinted on the base. Further, the expanded Neugebauer primary color calculation section 1111 converts the calculated spectral reflectance $R_{KM}(\lambda)$ to the spectral density gradation optical density $OD_{KM}(\lambda)$ using Formula (5).

Similarly, in calculating the spectral reflectance $R_{KM}(\lambda)$ in the area Q7, the expanded Neugebauer primary color calculation section 1111 applies the density gradation spectral reflectance $R_{im}(\lambda)$ of the cyan ink of 50% thickness on the print medium to the spectral reflectance $R_0(\lambda)$ of base, thereby calculating the spectral reflectance $R_{KM}(\lambda)$ where the magenta ink of 100% thickness is overprinted on the base. Further, the expanded Neugebauer primary color calculation section 1111 converts the calculated spectral reflectance $R_{KM}(\lambda)$ to the spectral density gradation optical density $OD_{KM}(\lambda)$ using Formula (5). Similarly, the spectral optical densities $OD_{KM}(\lambda)$ are calculated in respect of all the combinations of the expanded Neugebauer primary colors.

Then, the spectral optical density calculation section 1113 multiplies the spectral optical density of each of the expanded Neugebauer primary colors in the areas Q1 to Q9, with a corresponding one of the expanded Neugebauer primary color appearance ratios. The multiplied values are added up on a wavelength basis.

The spectral optical density calculation section 1113 calculates a predicted spectral optical density $OD_D(\lambda)$ in a print portion, which would result from overprinting dots of the magenta ink on the print medium on which the dots of the cyan ink is printed.

The spectral reflectance calculation section 1114 converts the predicted spectral optical density $OD_D(\lambda)$ calculated by the spectral optical density calculation section 1113 to a second predicted spectral reflectance $R_{D2}(\lambda)$ using the following Formula (8).

$$R(\lambda) = e^{-D(\lambda)} \tag{8}$$

<Operation of Mixing Prediction Section 114>

The mixing prediction section 114 reads a weight coefficient w to be multiplied with the first and second predicted spectral reflectances $R_{D1}(\lambda)$ and $R_{D2}(\lambda)$, from the prediction parameter database 126. For example, the mixing prediction section 114 adds $wR_{D1}(\lambda)$ to $(1-w)R_{D2}(\lambda)$ to calculate an integrated predicted spectral reflectance $R_D(\lambda)$.

The color prediction table preparation section 109 determines a viewing light source, and calculate tristimulus values XYZ, CIELAB (International Commission on Illumination (CIE) Lab) values and the like, for the integrated predicted spectral reflectance $R_D(\lambda)$, and prepares a color prediction table used for predicting a reproduced color. Specifically, the color prediction table preparation section 109 prepares the color prediction table in which the information of inputted data (CMY (cyan-magenta-yellow) values in the present embodiment), which is targeted to a color prediction process, is correlated to reproduced color information that expresses a reproduced color which is predicted on the basis of the integrated predicted spectral reflectance $R_D(\lambda)$. It should be noted that, in the present embodiment, the color prediction table preparation section 109 prepares the color prediction table using a known ICC (international color consortium) profile format and outputs the prepared table via the output section 110.

<Preparation of Color Prediction Table>

FIG. 8 is a flow diagram illustrating an example of a process of preparing a color prediction table performed by the color prediction table preparation section 109.

Step S401:

The expanded Neugebauer primary color appearance ratio calculation section 1082 reads the spectral reflectances $R_{KM}(\lambda)$ of the Neugebauer primary colors of the spot color inks in the overlapped areas, from the Neugebauer primary color table of the memory 125.

Similarly, the expanded Neugebauer primary color reflectance ratio calculation section 1112 reads the spectral optical densities $OD_{KM}(\lambda)$ of the Neugebauer primary colors of the spot color inks in the overlapped areas, from the Neugebauer primary color table of the memory 125.

Step S402:

As mentioned above, the mixing prediction section 114 integrates the first predicted spectral reflectance $R_{D1}(\lambda)$ predicted by the spectral reflectance prediction unit 108 with the second predicted spectral reflectance $R_{D2}(\lambda)$ predicted by the spectral optical density prediction unit 111. In integrating these spectral reflectances, the mixing prediction section 114 reads a weight coefficient w to be multiplied with each of the first and second predicted spectral reflectances $R_{D1}(\lambda)$ and $R_{D2}(\lambda)$, from the prediction parameter database 126.

Step S403:

Then, the expanded Neugebauer primary color appearance ratio calculation section 1082 extracts command dot area ratios not yet processed, from matrices of command dot area ratios of the inks to be overlapped with each other in the color prediction table of the memory 125.

The expanded Neugebauer primary color appearance ratio calculation section 1082 sets a combination of the extracted command dot area ratios as a target of calculation. The process described above may be ensured to be performed by the expanded Neugebauer primary color reflectance ratio calculation section 1112.

Step S404:

The spectral reflectance prediction unit 108 calculates the first predicted spectral reflectance $R_{D1}(\lambda)$ of the combination of the command dot area ratios.

The spectral optical density prediction unit 111 calculates the second predicted spectral reflectance $R_{D2}(\lambda)$ of the combination of the command dot area ratios.

Further, the mixing prediction section 114 multiplies the first and second predicted spectral reflectances $R_{D1}(\lambda)$ and $R_{D2}(\lambda)$ with the weight coefficient w read at step S402 and a weight coefficient $(1-w)$, respectively, and adds up $wR_{D1}(\lambda)$ and $(1-w)R_{D2}(\lambda)$ to obtain the integrated predicted spectral reflectance $R_D(\lambda)$. Further, for the calculated integrated predicted spectral reflectance $R_D(\lambda)$, the mixing prediction section 114 sets a spectral distribution of a viewing light source and the standard observer to calculate a colorimetric value.

Step S405:

Then, the mixing prediction section 114 correlates the calculated colorimetric value with the combination of the command dot area ratios of the inks (spot color inks or primary color inks) to be overlapped with each other, and writes and stores the correlation into the color prediction table of the memory 125.

Step S406:

The expanded Neugebauer primary color appearance ratio calculation section 1082 judges whether or not the calculation of the integrated predicted spectral reflectance $R_D(\lambda)$ has been completed in respect of all the combinations of the command dot area ratios in the color prediction table of the memory 125.

If the calculation of the integrated predicted spectral reflectance $R_D(\lambda)$ has been completed in respect of all the combinations of the command dot area ratios, the expanded Neugebauer primary color appearance ratio calculation section 1082 allows the process to proceed to step S407. On the other hand, if the calculation of the integrated predicted spectral reflectance $R_D(\lambda)$ has not yet been completed in respect of all the combinations of the command dot area ratios, the expanded Neugebauer primary color appearance ratio calculation section 1082 allows the process to return to step S403.

The process described above may be ensured to be performed by the expanded Neugebauer primary color reflectance ratio calculation section 1112.

Step S407:

The color prediction table preparation section 109 reads the data in the color prediction table of the memory 125, converts the data to a known ICC profile format, and outputs the converted data of color prediction profile via the output section 110.

<Preparation of Spot Color Separation Table>

The spot color separation table preparation section 130 prepares a spot color separation table. The spot color separation table is prepared for each combination of spot color inks to be overlapped with each other. The spot color separation table stores combinations of command dot area ratios for each spot color ink needed for reproducing colorimetric values each expressed by each coordinate in a color space (of L*a*b* in the present embodiment). The color space is divided at a predetermined cycle, with the coordinate points being discretely set therein.

Specifically, the spot color separation table preparation section 130 prepares a spot color separation table in which input values such as of XYZ or CIELAB are correlated to output values of the command dot area ratios of a spot color ink, and writes and stores the prepared table into the spot color separation table of the memory 125. In the present embodiment, the spot color separation table preparation section 130 converts the spot color separation table in the memory 125 to a known ICC profile format, and outputs the converted data of spot color separation profile via the output section 110.

Figure 9:
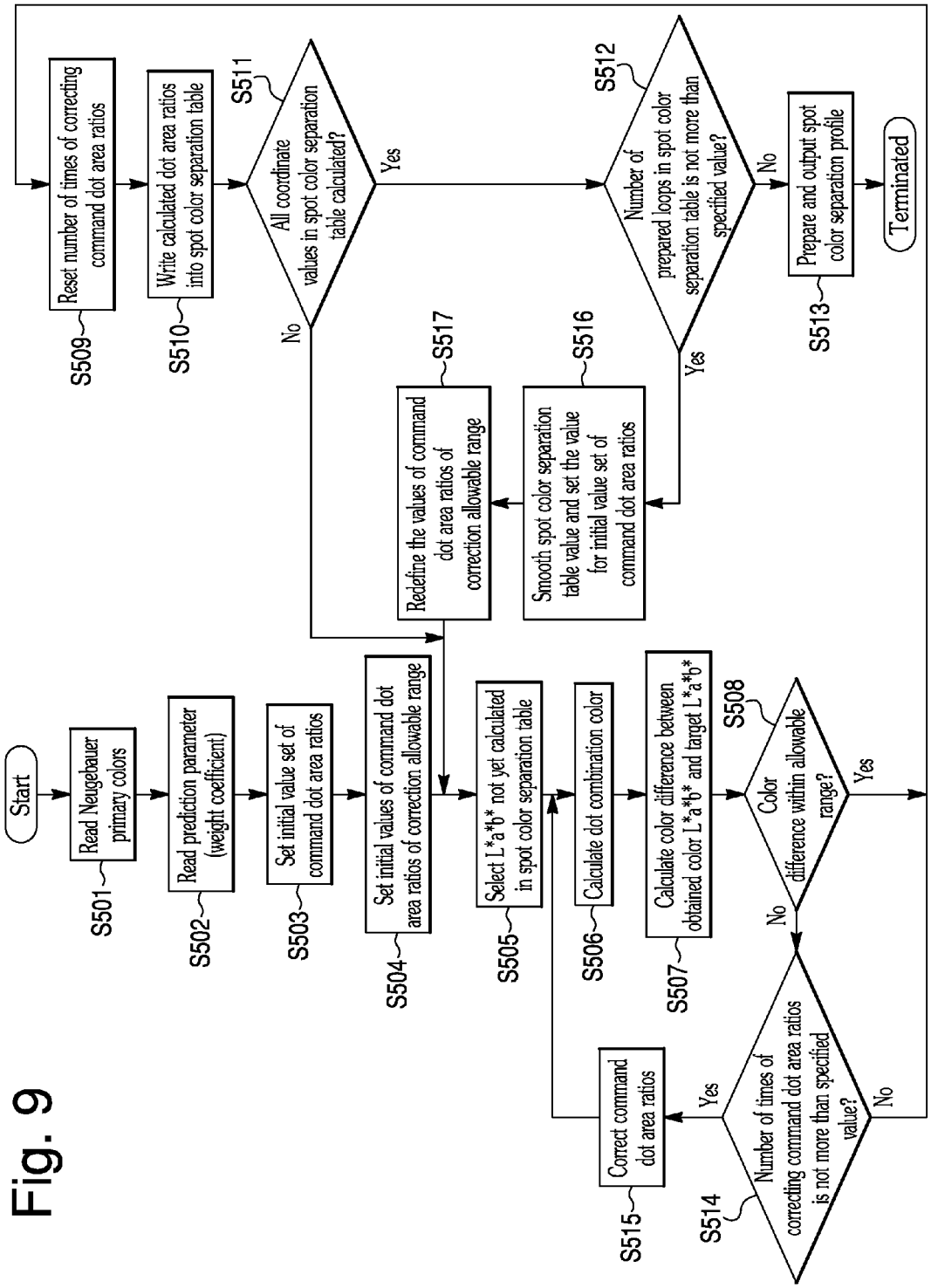
FIG. 9 is a flow diagram illustrating an example of a process of preparing a spot color separation table performed by a spot color separation table preparation section, according to the first embodiment.

FIG. 9 is a flow diagram illustrating an example of a process of preparing the spot color separation table performed by the spot color separation table preparation section 130 of the present embodiment.

Step S501:

The spot color separation table preparation section 130 reads the spectral reflectances $R_{KM}(\lambda)$ of the Neugebauer primary colors of the spot color inks in the overlapped areas, from the Neugebauer primary color table of the memory 125.

Step S502:

In integrating the first predicted spectral reflectances $R_{D1}(\lambda)$ predicted by the spectral reflectance prediction unit 108 with the second predicted spectral reflectances $R_{D2}(\lambda)$ predicted by the spectral optical density prediction unit 111, the spot color separation table preparation section 130 reads the weight coefficient w to be multiplies with each of the first and second predicted spectral reflectances $R_{D1}(\lambda)$ and $R_{D2}(\lambda)$ from the prediction parameter database 126.

Step S503:

The spot color separation table preparation section 130 reads a set of initial set values of command dot area ratios of the spot color inks to be combined from a dot area ratio initial value set database 127 where sets of initial values of command dot area ratios of the respective spot color inks to be combined are stored in advance.

Then, the spot color separation table preparation section 130 sets the read initial set values as initial values of the command dot area ratios used for the following calculation.

Step S504:

The spot color separation table preparation section 130 sets an allowable range of variation of the command dot area ratios in correcting (adjusting) the command dot area ratios.

Step S505:

The spot color separation table preparation section 130 selects an L*a*b* value of a coordinate not yet processed, as a target L*a*b* value in the color space of the spot color separation table. In this case, if the number of corrections is 0, the spot color separation table preparation section 130 uses the read initial set values as command dot area ratios.

Step S506:

Using a process similar to the one used by the spectral reflectance prediction unit 108 or the spectral optical density prediction unit 111, the spot color separation table preparation section 130 generates the first and second predicted spectral reflectances $R_{D1}(\lambda)$ and $R_{D2}(\lambda)$ for the command dot area ratios.

The spot color separation table preparation section 130 then multiplies the read weight coefficient w and a weight coefficient (1−w) with the first and second predicted spectral reflectances $R_{D1}(\lambda)$ and $R_{D2}(\lambda)$, respectively. The spot color separation table preparation section 130 adds the results of the multiplications $wR_{D1}(\lambda)$ and $(1-w)R_{D2}(\lambda)$ to obtain the integrated predicted spectral reflectance $R_D(\lambda)$. Further, the spot color separation table preparation section 130 sets a spectral distribution of a viewing light source and the standard observer, for the calculated integrated predicted spectral reflectance $R_D(\lambda)$ to thereby calculate a colorimetric value.

Step S507:

Then, the spot color separation table preparation section 130 calculates a color difference between the target L*a*b* value and an L*a*b* value calculated from the integrated predicted spectral reflectance $R_D(\lambda)$.

The spot color separation table preparation section 130 judges whether or not the color difference between the target L*a*b* value and the calculated L*a*b* value falls within a preset range.

If the color difference is in the preset range, the spot color separation table preparation section 130 allows the process to proceed to step S509. If the color difference is not in the preset range, the spot color separation table preparation section 130 allows the process to proceed to step S514.

Step S509:

The spot color separation table preparation section 130 resets a counter for counting the number of times of corrections of the command dot area ratios, so that the number of corrections is set to 0.

Step S510:

The spot color separation table preparation section 130 writes and stores the command dot area ratios used in calculating the present integrated predicted spectral reflectance $R_D(\lambda)$ into the spot color separation table of the memory 125, being correlated to the target L*a*b* value in the table.

Step S511:

The spot color separation table preparation section 130 judges whether or not calculations have been completed in respect of all the L*a*b* values in the coordinate values of the predetermined cycle in the color space of the spot color separation table.

If calculations have been completed in respect of all the L*a*b* values in the color space, the spot color separation table preparation section 130 allows the process to proceed to step S512. If calculations have not been completed in respect of all the L*a*b* values in the color space, the spot color separation table preparation section 130 allows the process to return to step S505.

Step S512:

The spot color separation table preparation section 130 judges whether or not the number of loops of preparing the spot color separation table is within a specified range.

If the number of loops of preparing the spot color separation table is within the specified range, the spot color separation table preparation section 130 allows the process to proceed to step S516. If the number of loops of preparing the spot color separation table exceeds the specified range, the spot color separation table preparation section 130 allows the process to proceed to step S513.

Step S513:

The spot color separation table preparation section 130 reads data from the spot color separation table of the memory 125, converts the read data to a known ICC profile format, and outputs the converted data of spot color separation profile via the output section 110.

Step S514:

The spot color separation table preparation section 130 judges whether or not the number of corrections of the command dot area ratios is a preset specified number of times.

If the number of corrections of the command dot area ratios is not more than the preset specified number of times, the spot color separation table preparation section 130 allows the process to proceed to step S515. If the number of corrections of the command dot area ratios exceeds the preset specified number of times, the spot color separation table preparation section 130 allows the process to return to step S509.

Step S515:

The spot color separation table preparation section 130 corrects the command dot area ratios of the respective spot color inks so as to fall within the allowable range of variation.

In this case, the spot color separation table preparation section 130 increments (by 1) the counter that counts the number of times of corrections of the command dot area ratios.

Step S516

The spot color separation table preparation section 130 smooths, for each spot color ink, the command dot area ratios correlated to all the L*a*b* values in the color space of the spot color separation table. Any method of smoothing may be used including a method in which the command dot area ratios set for adjacent coordinate values are averaged for each spot color ink, or a method in which a generally used smoothing filter is applied to the three-dimensional space of L*a*b* values, which is divided at a predetermined cycle.

Then, the spot color separation table preparation section 130 uses the set of values of the smoothed command dot area ratios as new initial values, in place of the set of initial set values of the command dot area ratios.

In this case, the spot color separation table preparation section 130 increments the counter for counting the number of table preparation loops.

Step S517:

The spot color separation table preparation section 130 changes (redefines) the allowable range of variation of the command dot area ratios to a narrower range by multiplying a predetermined ratio (e.g., 1/2) with the present values. Further, the spot color separation table preparation section 130 turns all the coordinates set in the color space of the color separation table to a state of not being subjected to calculation.

Then, the spot color separation table preparation section 130 allows the process to return to step S505.

As described above, according to the present embodiment, absorption and scattering characteristics of a spot color ink can be estimated from primary color inks, and a spectral reflectance of the spot color ink can be calculated. Thus, a spectral reflectance of an area which would result from overlapping spot color inks with each other can be obtained.

Thus, according to the present embodiment, a reproduced color can be easily predicted with high accuracy for a printed matter on which spot color inks are overlapped with each other, when performing gravure printing, for example, which has color expressions of both of area modulation gradation and density modulation gradation.

In the present embodiment, a weight coefficient w obtained in advance is used for mixing a predicted spectral reflectance $R_{D1}(\lambda)$ and a predicted spectral reflectance $R_{D2}(\lambda)$, where $R_{D1}(\lambda)$ is calculated from the spectral reflectances of an expanded Neugebauer primary color, and the appearance ratios of the Neugebauer primary color, and $R_{D2}(\lambda)$ is calculated from the spectral optical densities of the expanded Neugebauer primary color, and the appearance ratios of the Neugebauer primary color Thus, a mixed predicted spectral reflectance $R_w(\lambda)$ can be obtained as a predicted spectral reflectance which is more approximate to an actually measured spectral reflectance.

Figure 10:
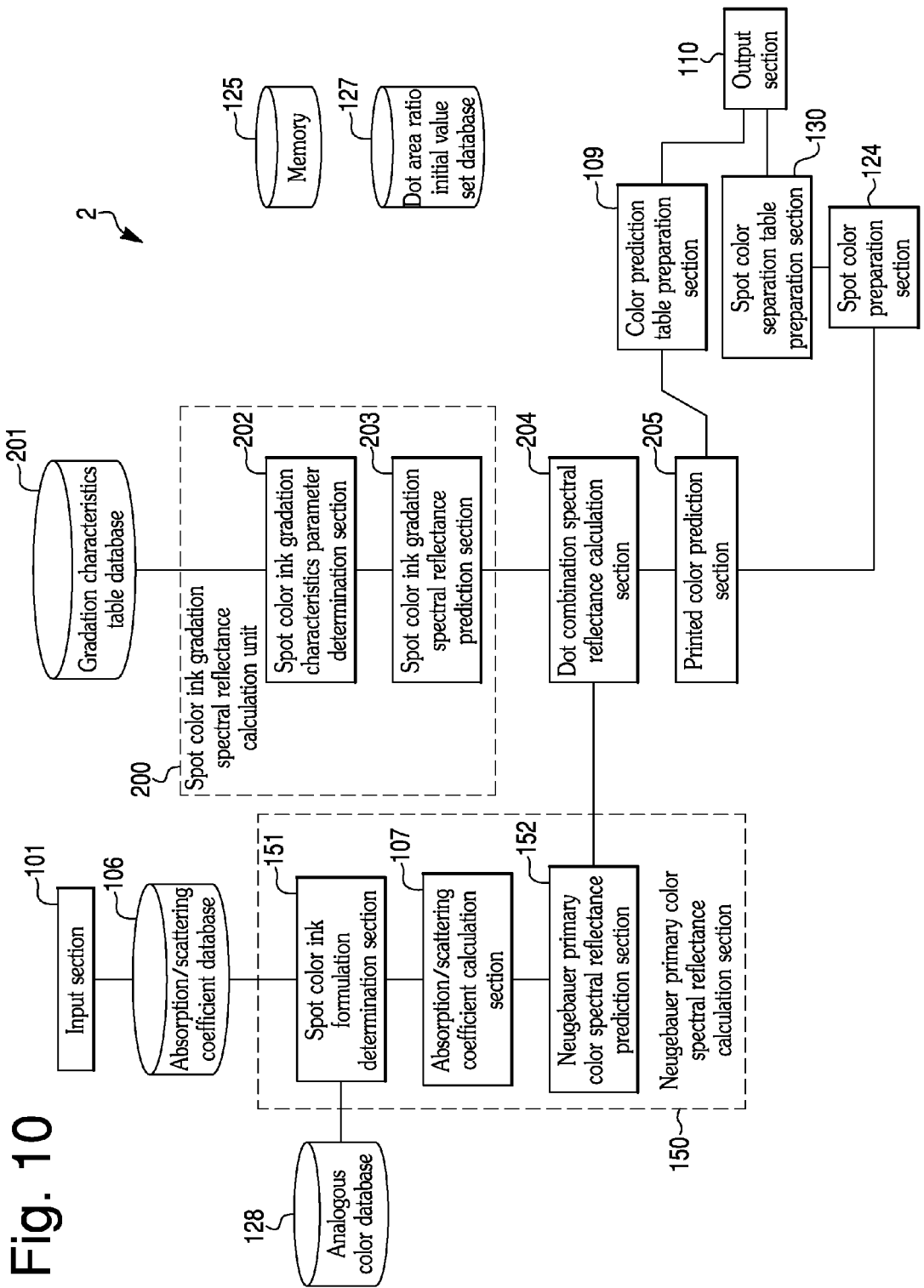
FIG. 10 is a block diagram illustrating an example of a configuration of a color prediction system according to a second embodiment of the present invention.

Referring now to FIGS. 10 and 11, a second embodiment of the present invention will be described.

It should be appreciated that, in the second embodiment, components identical with or similar to those in the first embodiment are given the same reference numerals for the sake of omitting unnecessary explanation. FIG. 10 is a block diagram illustrating an example of a configuration of a color prediction system 2, according to the second embodiment.

As shown in FIG. 10, the color prediction system 2 includes an input section 101, coefficient database 106, color prediction table preparation section 109, output section 110, spot color separation section 124, memory 125, dot area ratio initial value set database 127, analogous color database 128, spot color separation table preparation section 130, Neugebauer primary color spectral reflectance prediction unit 150, spot color ink gradation spectral reflectance calculation unit 200, dot combination spectral reflectance calculation section 204, and printed color prediction section 205.

The Neugebauer primary color spectral reflectance prediction unit 150 calculates absorption/scattering characteristics of a spot color ink on the basis of scattering coefficients $S(\lambda)$ and absorption coefficients $K(\lambda)$ of primary color inks stored in the absorption/scattering coefficient database 106, and then calculates a spectral reflectance of a Neugebauer primary color on the basis of the calculated absorption/scattering characteristics.

The spot color ink gradation spectral reflectance calculation unit 200 calculates gradation characteristics of a spot color ink on the basis of data of a gradation characteristics table database 201 of primary color inks, and then calculates a spectral reflectance of an arbitrary gradation of the spot color ink on the basis of the calculated gradation characteristics.

The following description describes operations of individual sections of the Neugebauer primary color spectral reflectance prediction unit 150 and the spot color ink gradation spectral reflectance calculation unit 200.

The Neugebauer primary color spectral reflectance predictions unit 150 includes an absorption/scattering coefficient calculation section 107, a spot color ink formulation determination section 151, and a Neugebauer primary color spectral reflectance prediction section 152. The spot color ink gradation spectral reflectance calculation unit 200 includes a spot color ink gradation characteristics parameter determinations section 202 and a spot color ink gradation spectral reflectance prediction section 203.

According to the flow diagram of FIG. 3, the spot color ink formulation determination section 151 determines a combination and a formulation ratio of primary colors configuring a spot color to which a colorimetric value of a sample color has been designated.

Specifically, the spot color ink formulation determination section 151 performs an operation similar to the operations of both of the spot color ink spectral reflectance calculation section 121 and the spot color ink formulation ratio determination section 122 of the first embodiment.

Similar to the first embodiment, the absorption/scattering coefficient calculation section 107 calculates a scattering coefficient $S_f(\lambda)$ and an absorption coefficient $K_f(\lambda)$ of a spot color ink, from the formulation ratio of the primary color inks of the spot color ink, which has been determined by the spot color ink formulation determination section 151.

The Neugebauer primary color spectral reflectance prediction section 152 substitutes the scattering coefficient $S_f(\lambda)$ and the absorption coefficient $K_f(\lambda)$ of the spot color ink, the base spectral reflectance $R_0(\lambda)$ of the printed medium, and the thickness coefficient $X_m$ into Formula (1) to calculate a spectral reflectance of the spot color ink as solidly printed. Further, when combinations of a plurality of spot colors to be used (which may include primary colors) and the order of printing the colors are specified, the Neugebauer primary color spectral reflectance prediction section 152 calculates spectral reflectances in the overlaps (i.e. spectral reflectances of Neugebauer primary colors) through Formula (1), in respect of all the combinations of the spot colors to be used. The calculated spectral reflectances of the Neugebauer primary colors are written and stored into the Neugebauer primary color table of the memory 125.

The gradation characteristics table database 201 stores in advance, calculated parameters indicating gradation characteristics of primary color inks (gradation characteristics parameters described later). In the present embodiment, gradation characteristics of a single color are expressed in terms of a model indicated by Formula (9), where $a_1(s)$ and $a_2(s)$ are gradation characteristics parameters. Similar to the first embodiment, the gradation characteristics parameters of primary color inks can be calculated in advance so that an error between the measured spectral reflectance $R_S(\lambda)$ of each command dot area ratio and the spectral reflectance calculated from Formula (9) is minimized.

$$R'(s, \lambda) = R_i(\lambda)a_1(s) + \left[\frac{R_i(\lambda)}{R_0(\lambda)}\right]^{\frac{1}{2}} R_0(\lambda)a_2(s) + R_0(\lambda)(1 - a_1(s) - a_2(s)) \quad (9)$$

where,
$R_i(\lambda)$: Spectral reflectance of solidly printed ink i
$R_0(\lambda)$: Spectral reflectance of paper Similar to the spot color density gradation appearance ratio calculation section 123 of the first embodiment, the spot color ink gradation characteristics parameter determinations section 202 reads gradation characteristics of primary colors from the gradation characteristics table database 201, on the basis of the formulation ratio of the spot color determined by the spot color ink formulation determination section 151 to determine gradation characteristics of the spot color. Similar to the first embodiment, the gradation characteristics of any of the read primary colors may be applied to the gradation characteristics of the spot color, or the gradation characteristics of the individual primary colors may be combined on the basis of the formulation ratio and used. The spot color ink gradation spectral reflectance prediction section 203 reads the spectral reflectance of the solidly printed spot color calculated by the Neugebauer primary color spectral reflectance prediction section 152, for substitution into Formula (9) together with the obtained gradation characteristics of the special ink, thereby obtaining a spectral reflectance R'(s, λ) corresponding to each command dot area ratio, for each spot color ink.

The obtained spectral reflectances R'(s, λ) are recorded on a spot color ink gradation spectral reflectance table of the memory 125.

FIG. 11 is a flow diagram illustrating a process of calculating a spectral reflectance of a spot color ink for each gradation.

Step S301:
The spot color ink gradation spectral reflectance prediction section 203 reads, from the Neugebauer primary color table of the memory 125, a spectral reflectance of a solidly printed spot color ink whose spectral reflectance should be calculated for each gradation.

Step S302:
The spot color ink gradation spectral reflectance prediction section 203 reads a formulation ratio of the set spot color ink from the formulation ratio table of spot color ink of the memory 125.

Step S303:
The spot color ink gradation characteristics parameter determination section 202 reads the gradation characteristics parameters $a_1(s)$ and $a_2(s)$ of the primary color inks configuring the spot color ink, from the gradation characteristics table database 201.

Step S304:
The spot color ink gradation characteristics parameter determination section 202 calculates gradation characteristics parameters $a_1(s)$ and $a_2(s)$ of the spot color ink through the process described above, on the basis of the gradation characteristics parameters $a_1(s)$ and $a_2(s)$ of the primary color inks read from the gradation characteristics table database 201.

Step S305:
The spot color ink gradation spectral reflectance prediction section 203 calculates the spectral reflectance R'(s, λ) corresponding to the command dot area ratio of the spot color ink that has been generated by mixing primary color inks at a predetermined ratio, on the basis of the gradation characteristics parameters $a_1(s)$ and $a_2(s)$ obtained by the spot color ink gradation characteristics parameter determination section 202.

Step S306:
The spot color ink gradation spectral reflectance prediction section 203 writes and stores the obtained spectral reflectance R'(s, λ) into the spot color gradation spectral reflectance table of the memory 125.

The dot combination spectral reflectance calculation section 204 reads the spectral reflectance R'(s, λ) corresponding to the command dot area ratio of the spot color ink from the spot color ink gradation spectral reflectance table of the memory 125.

Then, the dot combination spectral reflectance calculation section 204 substitutes the spectral reflectance R'(s, λ), the spectral reflectance $R_{KM}(\lambda)$ of solidly printed spot color ink, and the spectral reflectance $R_0(\lambda)$ of the print base paper into the following Formula (10) to calculate a spectral effective dot area ratio $a_{eff,i}(\lambda)$.

$$a_{eff,i}(\lambda) = \frac{R'(s, \lambda) - (R_0(\lambda)}{R_{KM}(\lambda) - R_0(\lambda)} \quad (10)$$

where,
$a_{eff,i}(\lambda)$ Effective dot area ratio of ink
R'(s, λ): Spectral reflectance of gradation of command dot area ratio S of ink
$R_{KM}(\lambda)$: Spectral reflectance of solidly printed ink
$R_0(\lambda)$: Spectral reflectance of paper
λ: Wavelength The dot combination spectral reflectance calculation section 204 calculates a spectral effective dot area ratio $F_{a,l}(\lambda)$ of a Neugebauer primary color l on the basis of the calculated effective dot area ratio $a_{\mathit{eff},i}(\lambda)$, using a predetermined Neugebauer formula. The symbol l herein indicates a Neugebauer primary color.

The dot combination spectral reflectance calculation section 204 substitutes the effective dot area ratio $F_{a,l}(\lambda)$ of the Neugebauer primary color l and a spectral reflectance $R_l(\lambda)$ of the Neugebauer primary color l into the following Formula (11) to calculate a spectral reflectance $R_j(\lambda)$ of a reproduced color.

$$R_j(\lambda) = \sum_l F_{a,l}(\lambda) R_l(\lambda) \tag{11}$$

where, $F_{a,l}(\lambda)$: Spectral effective dot area ratio of Neugebauer primary color l $R_l(\lambda)$: Spectral reflectance of Neugebauer primary color l $R_j(\lambda)$: Predicted spectral reflectance The printed color prediction section 205 sets a spectral distribution of a viewing light source and the standard observer for the spectral reflectance $R_j(\lambda)$ of the reproduced color to calculate a colorimetric value.

Then, the printed color prediction section 205 writes and stores the colorimetric value calculated by the Neugebauer primary color spectral reflectance prediction section 152 into the color prediction table of the memory 125, being correlated to the combination of the command dot area ratios of the spot color inks to be overlapped with each other.

Similar to the first embodiment, the color prediction table preparation section 109 allows the dot combination spectral reflectance calculation section 204 and the printed color prediction 205 to calculate colorimetric values for the combinations of command dot area ratios not yet processed in the prediction table of the memory 125. Thus, the color prediction table preparation section 109 obtains colorimetric values for all the combinations of command dot area ratios in the color prediction table, the combinations corresponding to respective predetermined combinations of spot color inks.

The output section 110, the spot color separation section 124 and the spot color separation table preparation section 130 are similar to those of the first embodiment and thus the description is omitted.

In the second embodiment, the predicted spectral reflectance calculated from the spectral reflectance of a Neugebauer primary color is used for printed color prediction, for the sake of simplifying the configuration. However, the calculation configuration similar to the first embodiment may be used. Specifically, the configuration of calculating the spectral optical density of a Neugebauer primary color, and calculating a second predicted spectral reflectance from the spectral optical density may be additionally used. Thus, through the mixed model, an integrated predicted spectral reflectance may be calculated based on the first predicted spectral reflectance calculated from a spectral reflectance and the second predicted spectral reflectance calculated from a spectral optical density, and then a colorimetric value of a printed color may be ensured to be calculated from the integrated predicted spectral reflectance.

As described above, according to the present embodiment, the absorption/scattering characteristics of a spot color ink can be estimated from primary color inks, and a spectral reflectance of the spot color ink can be calculated, and thus, the spectral reflectance of an overlapped area, which would result from overprinting spot color inks can be calculated, in a printing method such as offset printing, for area modulation gradation.

Further, according to the present embodiment, a colorimetric value and a spectral reflectance of any color to be reproduced by multiplying dots can be calculated on the basis of the spectral reflectance of a Neugebauer primary color and the spectral reflectance of an optional gradation of a spot color ink, using a spectral expanded Neugebauer mixed model.

Specifically, according to the present embodiment, characteristics of a spot color ink are obtained from the characteristics of the primary color inks, and based on the obtained characteristics of the spot color ink, colorimetric value and spectral reflectance of any color reproduced by the spot color ink can be highly accurately calculated. This basic function of the present invention is consistent throughout the embodiments. As described above, the present embodiment exerts high prediction accuracy when applied to a printing method for area modulation gradation, such as offset printing mainly, which expresses gradation by the area of dots.

The present embodiment can provide a color prediction method for a spot color ink, which can be easily applied to any color prediction method expanded with the development of the traditional Neugebauer equation.

A program for realizing the functions of the color prediction system 1 or 2 of the present invention as illustrated in FIG. 1 or 10, respectively, may be recorded on a computer readable recording medium, and the program recorded on the recording medium may be read and executed by a computer system to thereby control color prediction. The "computer system" herein referred to includes hardware, such as OS, peripheral devices, and the like. Further, the "computer system" herein includes a www (web-based) system that is provided with a website provision environment (or display environment). The "computer readable recording medium" herein refers to: a portable medium, such as a flexible disk, a magnetic optical disk, ROM or CD-ROM; or a storage device, such as a hard disk incorporated in a computer system. Further, the "computer readable recording medium" herein refers to a medium that retains a program for a predetermined period of time, such as a nonvolatile memory (RAM) in a computer system which serves as a server or a client when the program is transmitted via a network, such as the internet, or a communication line, such as a telephone line.

The above program may be transmitted from a computer system in which the program is stored in a storage device, to another computer system via a transmission medium or transmission waves in a transmission medium. The "transmission medium" that transmits the program refers to a medium, such as a network (communication net) such as of an internet, or a communication line such as of telephone line, which has a function of transmitting information. The above program may be one that partially realizes the functions mentioned above. Further, the above program may be a so-called differential file (differential program) that can realize the above functions with the combination of a program already recorded on the computer system.

The invention being thus described, it will be clear that the same may be varied in many ways. Such variations are not to be regarded as a departure from the spirit and scope of the invention and all such modifications as would be clear to one skilled in the art are intended to be included within the scope of the following claims.

What is claimed is:

1. A color prediction system comprising:
an absorption/scattering coefficient database in which absorption coefficients and scattering coefficients of primary colors are written and stored in advance;
a spot color ink spectral reflectance calculation section that selects a spot color ink configured by combining primary color inks which are preferable for reproducing a colorimetric value measured from a color sample whose color is desired to be reproduced, reads absorption coefficients and scattering coefficients of primary color inks contained in the spot color ink from the absorption/scattering coefficient database, obtains an absorption coefficient and a scattering coefficient of the spot color ink according to a specified formulation ratio, and calculates a spectral reflectance of the spot color ink desired to be reproduced, on the basis of the obtained absorption coefficient and scattering coefficient;
a spot color ink reproduction color calculation section that obtains a reproduced color from the spectral reflectance calculated by the spot color ink spectral reflectance calculation section;
a spot color ink formulation ratio determination section that obtains a difference from the colorimetric value measured from the color sample, and appropriately corrects the specified formulation ratio to calculate a formulation ratio which allows the difference to fall within a predetermined allowable range; and
a spectral data calculation section that calculates a Neugebauer primary color resulting from overprinting the spot color inks, on the basis of the absorption coefficients and scattering coefficients of the spot color inks calculated from the respective formulation ratios of the spot color inks determined by the spot color ink formulation ratio determination section.

2. The color prediction system according to claim 1, wherein:
the system comprises:
a density gradation appearance ratio table database that stores appearance ratio functions indicating appearance ratios of density gradation areas according to respective command dot area ratios, for each of primary color inks;
a spot color density gradation appearance ratio calculation section that obtains an appearance ratio function of the spot color ink on the basis of formulation information of the primary color inks, using the appearance ratio functions of the primary color inks contained in the spot color ink; and
a spot color density gradation spectral reflection calculation section that obtains a spectral reflectance of a density gradation area of the spot color ink, wherein
the spectral data calculation section calculates a spectral reflectance indicating a reproduced color of the spot color having dots which are formed at the command dot area ratio, using a calculation model which expresses correlation of density gradation areas of the spot color ink and appearance ratios of the respective density gradation areas, with spectral reflectances.

3. The color prediction system according to claim 1, wherein, in estimating a reproduced color formed of dots of a plurality of spot color inks, the spectral reflectance calculated by the spectral data calculation section and the appearance ratio functions are used as bases to obtain combinations of the overlapped portions and appearance ratios thereof in each dot, and estimate a spectral reflectance where a dot is printed over another dot.

4. The color prediction system according to claim 1, wherein the system further comprises a prediction parameter database that stores color prediction parameters including mixing ratios for mixing the spectral reflectance of the spot color ink obtained by the spectral data calculation section through the calculation model, with the spectral reflectance obtained by the spectral data calculation section using spectral optical densities.

5. The color prediction system according to claim 1, wherein the system further comprises a color prediction table preparation section that allows the spectral data calculation section to calculate a spectral reflectance for each combination of command dot area ratios of each of the spot color inks to be overprinted with each other, and prepares a profile of a reproduced color in a color space.

6. The color prediction system according to claim 1, wherein the system further comprises a spot color separation table preparation section that obtains, for each of serial coordinate values in a color space, a command dot area ratio of each of spot color inks that reproduce a reproduced color of the coordinate values.

7. The color prediction system according to claim 1, wherein a print medium on which spot color inks are printed, printing order of the spot color inks in performing overprinting, and a thickness of each spot color ink are arbitrarily set.

8. A color prediction method comprising steps of:
spot color ink spectral reflectance calculation in which a spot color ink spectral reflectance calculation section selects a spot color ink configured by combining primary color inks which are preferable for reproducing a colorimetric value measured from a color sample whose color is desired to be reproduced, reads absorption coefficients and scattering coefficients of primary color inks contained in a reference spot color ink from an absorption/scattering coefficient database that stores in advance absorption coefficients and scattering coefficients of primary colors, obtains an absorption coefficient and a scattering coefficient of the spot color ink according to a specified formulation ratio, and calculates a spectral reflectance of the spot color ink desired to be reproduced, on the basis of the obtained absorption coefficient and scattering coefficient;
spot color ink reproduction color calculation in which a spot color ink reproduction color calculation section obtains a reproduced color from the spectral reflectance calculated by the spot color ink spectral reflectance calculation section;
spot color formulation ratio determination in which a spot color ink formulation ratio determination section obtains a difference from the colorimetric value measured from the color sample, and appropriately corrects the specified formulation ratio to calculate a formulation ratio which allows the difference to fall within a predetermined allowable range; and
spectral data calculation in which a spectral data calculation section calculates a Neugebauer primary color resulting from overprinting the spot color inks, on the basis of the absorption coefficients and scattering coefficients of the spot color inks calculated from the respective formulation ratios of the spot color inks determined by the spot color ink formulation ratio determination section.

* * * * *